(12) United States Patent
Nowicki et al.

(10) Patent No.: US 12,306,902 B2
(45) Date of Patent: May 20, 2025

(54) HARDWARE ACCELERATION FOR COMPUTING EIGENPAIRS OF A MATRIX

(71) Applicant: International Business Machines Corporation, Armonk, NY (US)

(72) Inventors: Tomasz J. Nowicki, Fort Montgomery, NY (US); Oguzhan Murat Onen, Boston, MA (US); Tayfun Gokmen, Briarcliff Manor, NY (US); Vasileios Kalantzis, White Plains, NY (US); Chai Wah Wu, Hopewell Junction, NY (US); Mark S. Squillante, Greenwich, CT (US); Malte Johannes Rasch, Chappaqua, NY (US); Wilfried Haensch, Somers, NY (US); Lior Horesh, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 17/245,801

(22) Filed: Apr. 30, 2021

(65) Prior Publication Data

US 2022/0366005 A1    Nov. 17, 2022

(51) Int. Cl.
  *G06F 17/16*    (2006.01)
  *G06N 3/065*    (2023.01)

(52) U.S. Cl.
  CPC .............. *G06F 17/16* (2013.01); *G06N 3/065* (2023.01)

(58) Field of Classification Search
  CPC ...................................................... G06F 17/16
  See application file for complete search history.

(56) References Cited

U.S. PATENT DOCUMENTS

| | | | |
|---|---|---|---|
| 8,179,300 B2 | 5/2012 | Pun et al. | |
| 9,646,243 B1 | 5/2017 | Gokmen | |
| 10,261,977 B2 | 4/2019 | Friedman et al. | |
| 10,373,051 B2 | 8/2019 | Gokmen et al. | |
| 2017/0091616 A1 | 3/2017 | Gokmen et al. | |
| 2017/0109626 A1 | 4/2017 | Gokmen et al. | |
| 2018/0322094 A1* | 11/2018 | Friedman | G06F 17/11 |

(Continued)

OTHER PUBLICATIONS

Z. Sun et al., "Solving Matrix Equations in One Step with Cross-Point Resistive Arrays," Proceedings of the National Academy of Sciences of the United States of America (PNAS), Mar. 5, 2019, vol. 116, No. 10, pp. 4123-4128.

(Continued)

*Primary Examiner* — Michael D. Yaary
(74) *Attorney, Agent, or Firm* — Erik Johnson; Ryan, Mason & Lewis, LLP

(57) ABSTRACT

Techniques are provided to implement hardware accelerated computing of eigenpairs of a matrix. For example, a system includes a processor, and a resistive processing unit coupled to the processor. The resistive processing unit includes an array of cells which include respective resistive devices, wherein at least a portion of the resistive devices are tunable to encode values of a given matrix which is storable in the array of cells. When the given matrix is stored in the array of cells, the processor is configured to determine an eigenvector of the stored matrix by executing a process which includes performing analog matrix-vector multiplication operations on the stored matrix to converge an initial vector to an estimate of the eigenvector of the stored matrix.

20 Claims, 12 Drawing Sheets

(56) References Cited

U.S. PATENT DOCUMENTS

2018/0373674 A1    12/2018    Hu et al.
2020/0279169 A1*   9/2020    Hoskins .................. G06N 3/10

OTHER PUBLICATIONS

B. D. Hoskins et al., "Streaming Batch Eigenupdates for Hardware Neural Networks," Frontiers in Neuroscience, Aug. 6, 2019, vol. 13, No. 793, 9 pages.

S. Liu et al., "A Memristor-Based Optimization Framework for Artificial Intelligence Applications," IEEE Circuits and Systems Magazine, Feb. 9, 2018, vol. 18, No. 1, pp. 29-44.

Wikipedia, "Power Iteration," https://en.wikipedia.org/w/index.php?title=Power_iteration&oldid=1002300566, Jan. 23, 2021, 6 pages.

P. Mell et al., "The NIST Definition of Cloud Computing," Recommendations of the National Institute of Standards and Technology, Special Publication 800-145, Sep. 2011, 7 pages.

PCT/EP2022/059708, International Search Report and Written Opinion of the International Searching Authority, Aug. 25, 2022, 11 pages.

S. Liu et al., "A Memristor-Based Optimization Framework for AI Applications," arXiv:1710.08882, https://arxiv.org/abs/1710.08882v1, Oct. 18, 2017, 28 pages.

Z. Sun et al., "In-Memory Eigenvector Computation in Time O(1)," Advanced Intelligent Systems, May 20, 2020, 8 pages, vol. 2, No. 8.

S. Dikmese et al., "Reducing Computational Complexity of Eigenvalue Based Spectrum Sensing for Cognitive Radio," 8th International Conference on Cognitive Radio Oriented Wireless Networks (CROWNCOM), Jul. 2013, pp. 61-67.

* cited by examiner

100

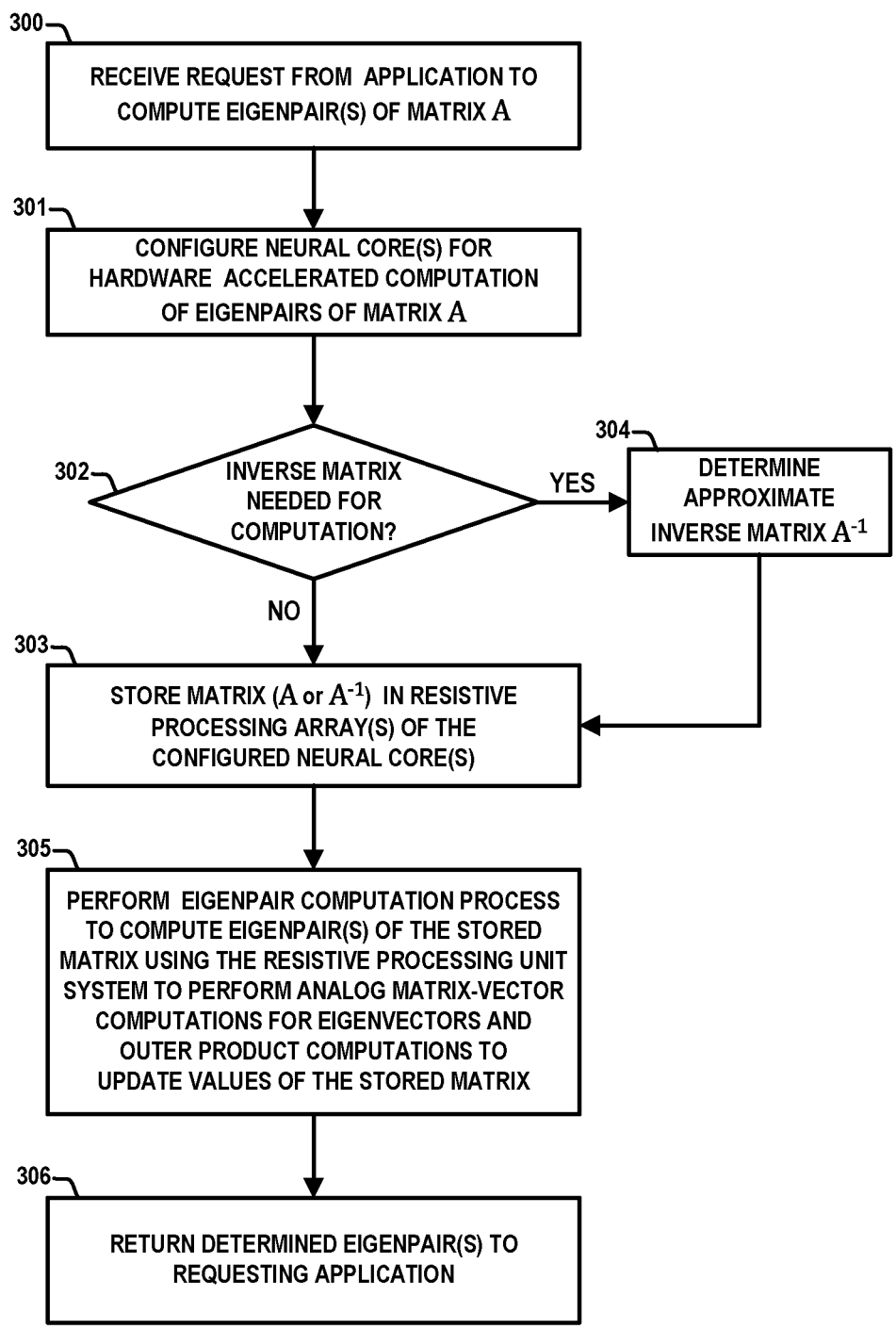

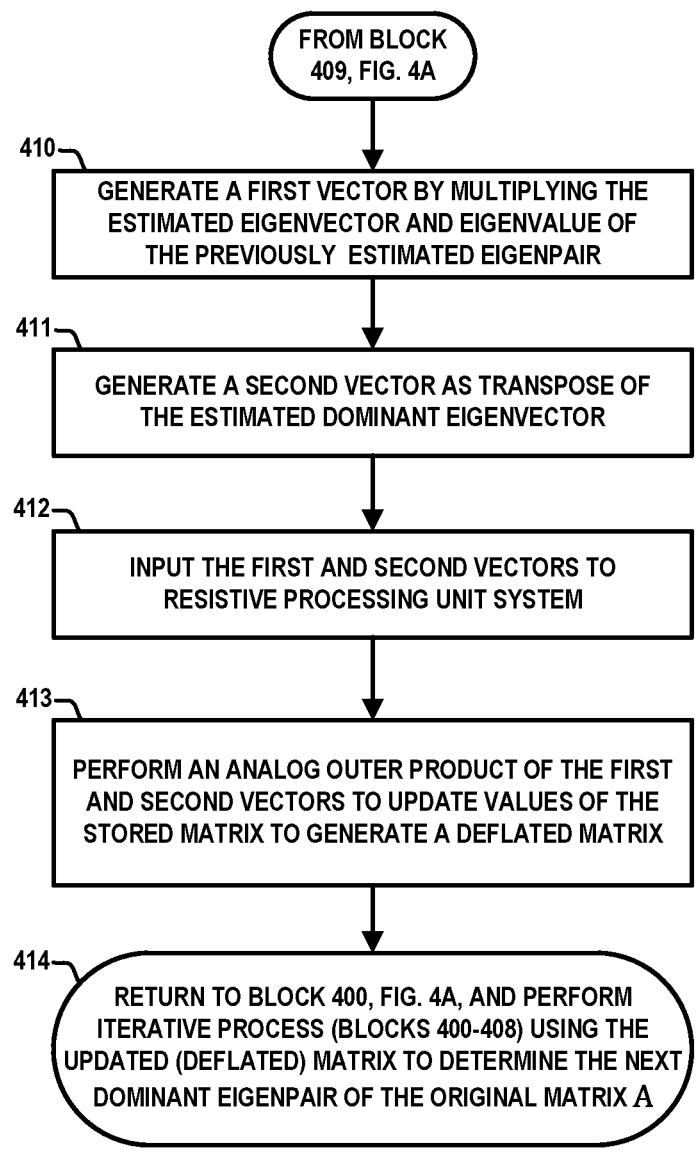

MATRIX-VECTOR
MULTIPLICATION $x^{(j+1)} = Ax^{(j)}$

OUTER PRODUCT UPDATE $D = A - (\lambda_1 \, x_1) \times x_1^T$
$D = A - U \times V$
$D = A - (u_1, ..., u_n) \times (v_1, ..., v_n)$

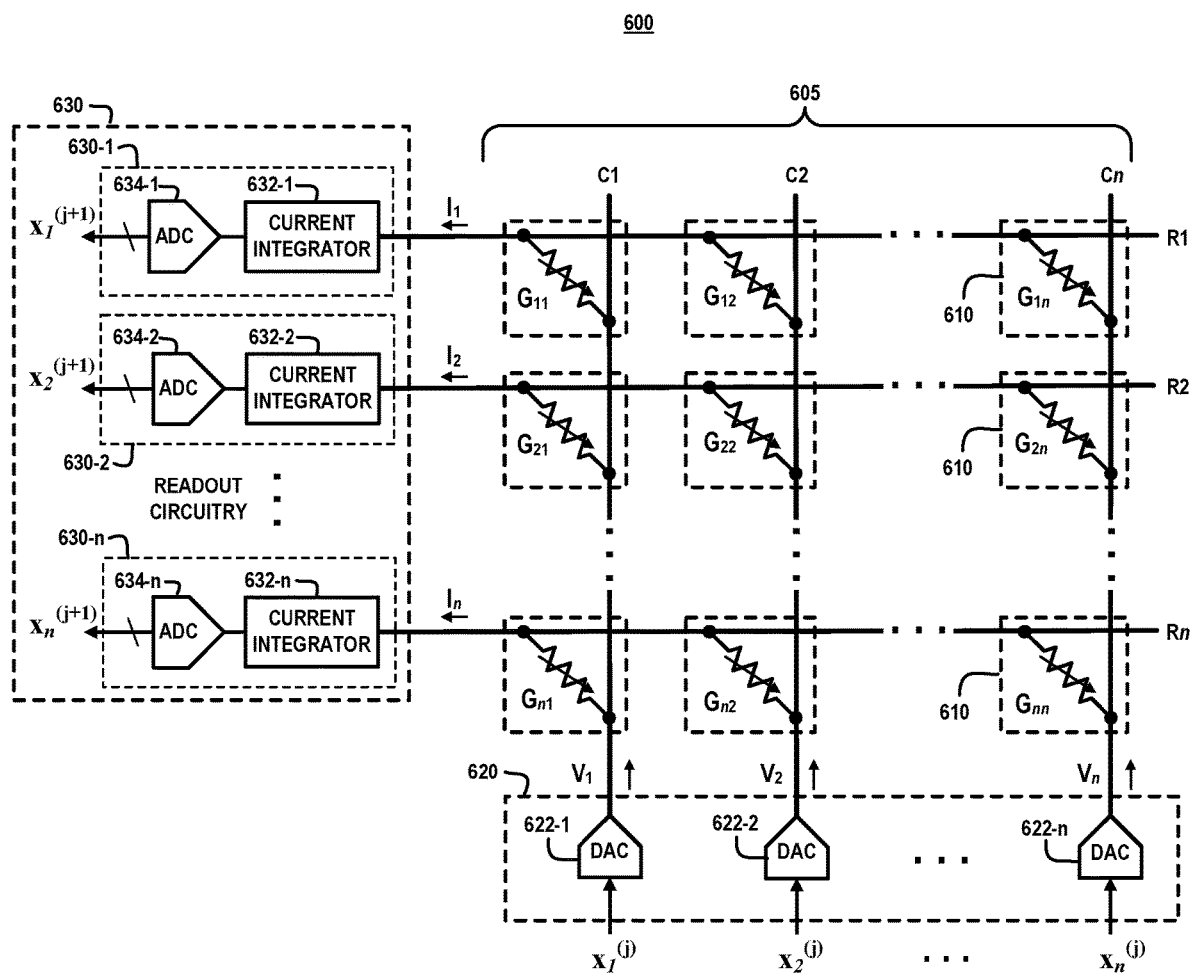

OUTER PRODUCT UPDATE

HARDWARE ACCELERATION FOR COMPUTING EIGENPAIRS OF A MATRIX

BACKGROUND

This disclosure relates generally to analog resistive processing systems for neuromorphic computing, and techniques for performing hardware accelerated numerical computing tasks using an analog resistive processing system. Information processing systems such as neuromorphic computing systems and artificial neural network systems are utilized in various applications such as machine learning and inference processing for cognitive recognition and computing. Such systems are hardware-based systems that generally include a large number of highly interconnected processing elements (referred to as "artificial neurons") which operate in parallel to perform various types of computations. The artificial neurons (e.g., pre-synaptic neurons and post-synaptic neurons) are connected using artificial synaptic devices which provide synaptic weights that represent connection strengths between the artificial neurons. The synaptic weights can be implemented using an array of resistive processing unit (RPU) cells having tunable resistive memory devices (e.g., tunable conductance), wherein conductance states of the RPU cells are encoded or otherwise mapped to the synaptic weights.

SUMMARY

Exemplary embodiments of the disclosure include systems, computer program products, and methods to implement hardware accelerated computing of eigenpairs of a matrix. In an exemplary embodiment, a system comprises a processor, and a resistive processing unit coupled to the processor. The resistive processing unit comprises an array of cells which respectively comprises resistive devices, wherein a least a portion of the resistive devices are tunable to encode values of a given matrix storable in the array of cells. When the given matrix is stored in the array of cells, the processor is configured to determine an eigenvector of the stored matrix by executing a process which comprises performing analog matrix-vector multiplication operations on the stored matrix to converge an initial vector to an estimate of the eigenvector of the stored matrix.

Other embodiments will be described in the following detailed description of exemplary embodiments, which is to be read in conjunction with the accompanying figures.

BRIEF DESCRIPTION OF THE DRAWINGS

FIG. 3 illustrates a method for performing an eigenpair computation process according to an exemplary embodiment of the disclosure.

FIGS. 4A and 4B illustrate a method for performing an eigenpair computation process according to an exemplary embodiment of the disclosure.

FIG. 6A schematically illustrates a method for configuring an RPU computing system comprising an array of RPU cells to perform a matrix-vector operation to implement hardware accelerated computing of eigenpairs of a matrix, according to an exemplary embodiment of the disclosure.

DETAILED DESCRIPTION

Embodiments of the invention will now be described in further detail with regard to systems and methods for providing hardware accelerated computing of eigenpairs of a matrix. It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration". Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., ASICs, FPGAs, etc.), processing devices (e.g., CPUs, GPUs, etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
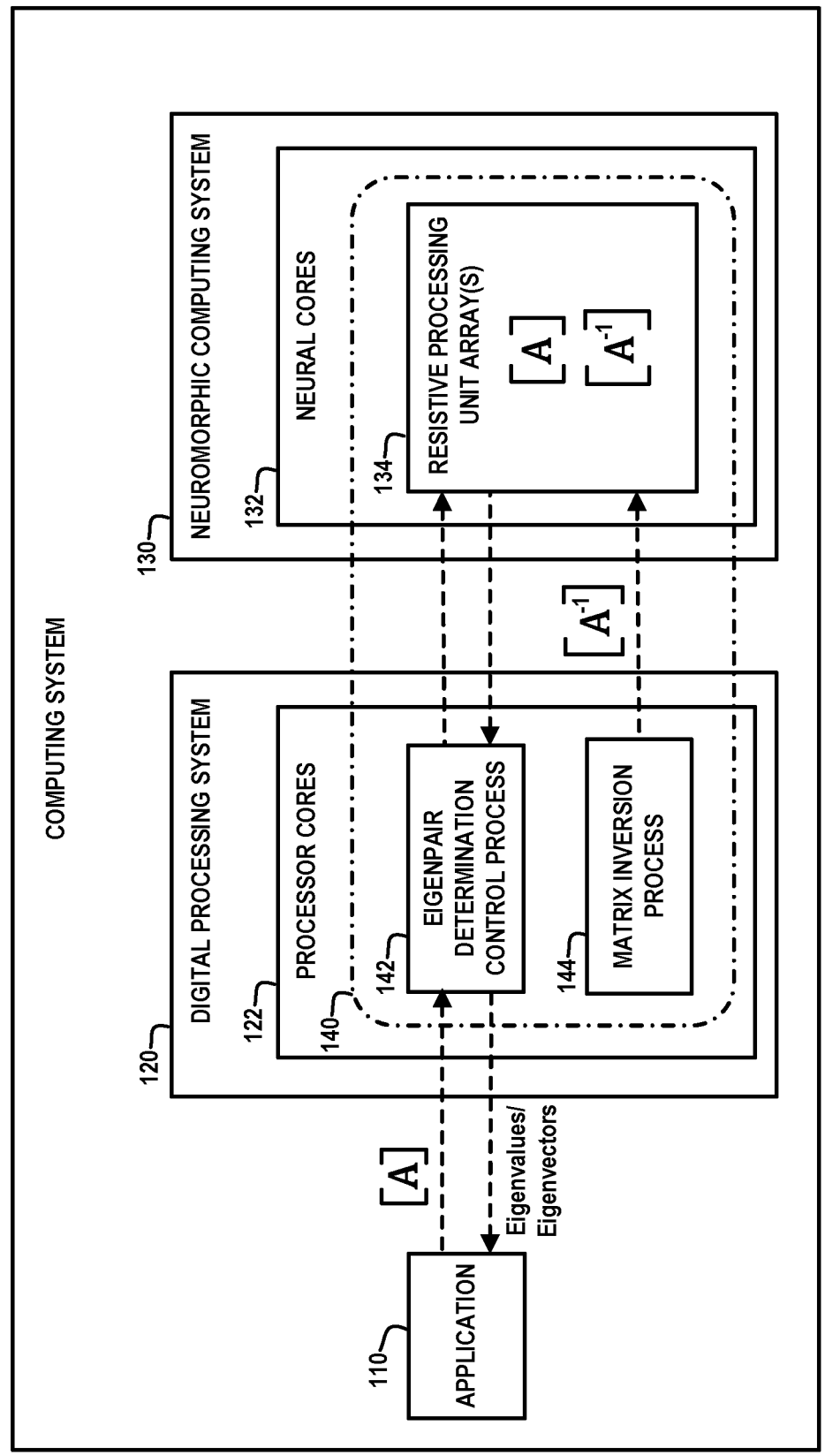
FIG. 1 schematically illustrates a computing system which implements hardware accelerated computing of eigenpairs of a matrix, according to an exemplary embodiment of the disclosure.

FIG. 1 schematically illustrates a computing system which implements hardware accelerated computing of eigenpairs of a matrix, according to an exemplary embodiment of the disclosure. In particular, FIG. 1 schematically illustrates a computing system 100 which comprises an application 110, a digital processing system 120, and a neuromorphic computing system 130. The digital processing system 120 comprises a plurality of processor cores 122. The neuromorphic computing system 130 comprises a plurality of neural cores 132. In some embodiments, the neuromorphic computing system 130 comprises a resistive processing unit (RPU) system in which each neural core 132 comprises one or more analog resistive processing unit arrays (e.g., analog RPU crossbar array hardware). The neural cores 132 are configured to support hardware acceleration for performing matrix decomposition operations such computing eigenpairs of a matrix, etc., by performing multiply-accumulate (MAC) operations in the analog domain to support hardware acceleration of numerical operations such as vector-matrix multiplication, matrix-vector multiplication, vector-vector multiplication, and/or matrix multiplication operations, which are performed on the RPU arrays 134.

In some embodiments, the digital processing system 120 controls the execution of a matrix decomposition process such as an eigenpair computation process 140 which is performed to compute eigenpairs of a given matrix A provided by the application 110. The eigenpair computation process 140 implements various processes and optimization solver methods to enable computation of eigenpairs of a matrix. For example, in some embodiments, the eigenpair computation process 140 implements an eigenpair determination control process 142, and a matrix inversion process 144, which are utilized by the eigenpair computation process 140 to compute one or more eigenpairs of the given matrix A. In some embodiments, the eigenpair determination control process 142 and a matrix inversion process 144 are software modules that are executed by the processor cores 122 of the digital processing system 120 to perform the eigenpair computation process 140. As explained in further detail below, the eigenpair computation process 140 utilizes the neuromorphic computing system 130 to perform hardware accelerated multiply-accumulate (MAC) operations in the analog domain through various in-memory computations, such as matrix-vector operations and vector-vector product operations (e.g., outer product operations) on a given matrix (e.g., original matrix A or an approximate (estimated) inverse matrix $A^{-1}$) which is stored in one or more of the RPU arrays 134, as schematically illustrated in FIG. 1.

The application 110 may comprise any type of computing application (e.g., scientific computing application, engineering application, graphics rendering application, signal processing application, facial recognition application, matrix diagonalization applications, a MIMO (Multiple-Input, Multiple-Output) system for wireless communications, cryptography, etc.) which utilizes matrices and inverse matrices as computational objects to perform numerical operations, to solve linear equations, and perform other computations. Mathematically, a linear system (or system of linear equations) is a collection of one or more linear equations that have the same set of variables, wherein a solution to the linear system involves assigning values to the variables such that all linear equations (of the linear system) are simultaneously satisfied. In mathematics, the theory of linear systems is the basis and a fundamental part of numerical linear algebra, which involves utilizing properties of vectors and matrices and associated vector/matrix operations to implement computer algorithms to solve linear systems in an efficient an accurate manner. Common problems in numerical linear algebra include obtaining matrix decompositions such as singular value decomposition, eigenvector decomposition, matrix diagonalization, etc., which can be utilized to determine eigenvalues and eigenvectors of a given matrix to thereby solve common linear algebraic problems such as solving liner systems of equations.

For example, a linear system of equations with constant coefficients can be solved using an algebraic method in which a matrix A is used to represent a linear transformation and an iterative process is utilized to determine eigenvalues and eigenvectors of the matrix, wherein the eigenvalues and eigenvectors of the matrix A represent solutions to the linear system. More specifically, a linear system of equations can be represented in the form of the following eigenvalue equation:

$$Ax = \lambda x \quad \text{(Eqn. 1)}$$

where A is an n×n matrix (or more particularly, a diagonalizable matrix) of real or complex numbers, where λ is a scalar number (real or complex) and is an eigenvalue of the matrix A, and where x is a non-zero vector (possibly complex) of dimension n and is an eigenvector of the matrix A. More specifically, in Eqn. 1, the n×n matrix A can represent a linear transformation, wherein eigenvectors are n×1 matrices. The eigenvalue equation (Eqn. 1) means that under action of a linear transformation A, a vector x is converted to a collinear vector Xx. Any vector with this property is deemed to be an eigenvector of the linear transformation A, and the associated scalar λ is deemed an eigenvalue. The term "eigenpair" as used herein denotes a mathematical pair of an eigenvector and is associated eigenvalue. In many applications, it is desirable to find the eigenpairs $(\lambda_i, x_i)$ of a given matrix A, wherein $\lambda_i$ an eigenvalue and $x_i$ is the corresponding eigenvector.

Essentially, an eigenvector x of a linear transformation of matrix A is a non-zero vector which does not change direction when A is applied to the eigenvector x. The application of the linear transformation A to the eigenvector x only scales the eigenvector x by an eigenvalue A. The eigenvectors represent the directions along which a linear transformation acts by simply stretching or compressing in a given direction, or reversing directions, while the eigenvalue provides the magnitude of the change in the given direction. In other words, the eigenvectors are the vectors that the linear transformation A merely elongates or shrinks, or reverses direction, and the amount by which the eigenvectors elongate/shrink/reverse direction is based on the eigenvalue. In this regard, an eigenvalue A may be any scalar value (or zero or complex), and an eigenvalue A may be negative, in which case the eigenvector reverses direction as part of the scaling.

A square n×n matrix A is diagonalizable if there exists an invertible matrix X and a diagonal matrix Λ such that $A = X \Lambda X^{-1}$ (while a symmetric matrix is diagonalizable by definition). In some embodiments, a process is implemented to diagonalize a matrix A, i.e., by determining matrices X and $\Lambda$ which satisfy $A=X\Lambda X^{-1}$. A given matrix A is diagonalizable if the matrix A has n linearly independent eigenvectors. In other words, if a real n×n matrix A has n eigenpairs $(\lambda_1, x_1), (\lambda_2, x_2), \ldots, (\lambda_n, x_n)$, such that the eigenvectors $x_1, x_2, \ldots, x_n$ are linearly independent, then $A=X\Lambda X^{-1}$, where X is an invertible n×n matrix whose columns are the vectors $x_1, x_2, \ldots, x_n$, i.e., $X=(x_1, x_2, \ldots, x_n)$, and $\Lambda$ is an n×n matrix where:

$$\Lambda = \begin{bmatrix} \lambda_1 & 0 & \ldots & 0 \\ 0 & \lambda_2 & \ldots & 0 \\ \vdots & \vdots & \ddots & \vdots \\ 0 & 0 & \ldots & \lambda_n \end{bmatrix}.$$

In this instance, the column vectors of X form a basis of eigenvectors of the matrix A, wherein the it column of X is the eigenvector $x_i$ of A, and $\Lambda$ is a diagonal matrix whose it diagonal element $\lambda_i$ is the corresponding eigenvalue. An eigen-decomposition operation of a diagonalizable matrix A in this regard is based on the fundamental property of eigenvectors, wherein $X^{-1}AX=\Lambda$, can be rewritten as $AX=X\Lambda$, which in turn can be rewritten as $Ax_i=\lambda_i x_i$, where the column vectors $x_i$ of X are right eigenvectors of A, the corresponding diagonal entry is the corresponding eigenvalue, and the row vectors of $X^{-1}$ are the left eigenvectors of A. The process of diagonalizing a matrix A is the same process as finding the eigenvalues and eigenvectors of the matrix in the case where the eigenvectors form a basis. It is to be noted that diagonalization can be used to efficiently compute the powers of a matrix as $A^k=X\Lambda^k X^{-1}$.

Furthermore, if X is a symmetric n×n matrix of which the columns of X are the n linearly independent eigenvectors of the symmetric matrix A, then X is an orthogonal matrix in which the transpose X is equal to the inverse of X, i.e., $X^T=X^{-1}$. In this regard, the eigenvalue equation Eqn. 1 can be written as $AX=X\Lambda$, wherein $\Lambda$ is a diagonal n×n matrix of which the elements are the eigenvalues of A in ordered correspondence with the columns of X. Based on $X^T=X^{-1}$, the equation $AX=X\Lambda$ can be rewritten as $A=X\Lambda X^T$, which can be further rewritten as $X^T AX=\Lambda$.

In some embodiments, the eigenpair computation process 140 implements an eigen-decomposition process to determine eigenvalues and eigenvectors of a given diagonalizable matrix, wherein the eigen-decomposition is based on, e.g., an iterative numerical method. In general, for a small n×n matrix A, the eigenvalues of the matrix A can be determined symbolically using the characteristic polynomial. In particular, starting with the eigenvalue equation (Eqn. 1) of $Ax=\lambda x$, multiplying the right side by the n×n identity matrix I yields $Ax=\lambda Ix$, which can be rewritten as $Ax-\lambda Ix=0$ or $(A-\lambda I)x=0$. Assuming x is non-zero, the characteristic polynomial equation $p(\lambda)=\det(A-\lambda I)=0$ can be used to compute eigenvalues, and the corresponding eigenvectors x can be computed based on the computed eigenvalues using the equation $(A-\lambda I)x=0$. For an n×n matrix A, the polynomial equation $p(\lambda)$ is of the $n^{th}$ degree in $\lambda$, which has n roots $\lambda_1, \lambda_2, \ldots, \lambda_n$, which roots are the eigenvalues of matrix A. For each eigenvalue $\lambda_i$ of matrix A, there is a corresponding non-zero solution $x_i$ of Eqn. 1. In practice, eigenvalues of large matrices are not computed using the characteristic polynomial, as the computation is expensive and computing exact (symbolic) roots of a high-degree polynomial can be difficult. Therefore, iterative numerical algorithms are utilized to computes estimates of eigenvectors and eigenvalues.

In some embodiments, the eigenpair computation process 140 performs an eigen-decomposition process using an iterative numerical method known as the "power iteration method." More specifically, in some embodiments, the eigenpair determination control process 142 implements methods that are configured to perform a power iteration process on a symmetric matrix A to compute one or more eigenpairs of the matrix A. Given a symmetric (and thus diagonalizable) matrix A, the power iteration process is performed to determine a greatest eigenvalue X (e.g., dominant eigenvalue X in absolute value) of the matrix A, and a corresponding dominant (non-zero) eigenvector v which corresponds to the dominant eigenvalue X, which satisfy the eigenvalue equation: $Ax=\lambda x$. An exemplary power iteration process will be discussed in further detail below with reference to the exemplary flow diagrams of FIGS. 4A and 4B.

In general, a power iteration method begins with an initial vector, which may be an approximation to the dominant eigenvector, or a random vector. The initial vector is utilized in an iterative process that computes a sequence of normalized vectors (or unit vectors) which represent a current estimate of the dominant eigenvector after each iteration, wherein it is expected that the sequence will converge to an eigenvector which corresponds to the dominant or principal eigenvalue. For every iteration, the resulting vector x is multiplied by the matrix A. If matrix A has an eigenvalue which is strictly greater in absolute magnitude that other eigenvalues of the matrix A, and assuming the initial vector has a non-zero component in the direction of an eigenvector associated with the dominant eigenvalue, then the computed sequence vectors will converge to the eigenvector associated with the dominant eigenvalue. In accordance with exemplary embodiments of the disclosure, hardware accelerated computing is utilized (via, e.g., an RPU computing system) during a power iteration process to perform the multiplication operations (Ax) for each iteration of the power iteration process. The power iteration process computes an estimate of the dominant eigenvector, and the corresponding dominant eigenvalue can be determined by, e.g., a Rayleigh quotient of the eigenvector.

The convergence of the power iteration process to the dominant eigenvector of a symmetric (diagonalizable) matrix A is demonstrated as follows. Assume that the eigenvalues of a given symmetric matrix $A \in \mathbb{R}^{n \times n}$ is diagonalizable with eigenvalues $|\lambda_1| \geq |\lambda_2| \geq \ldots |\lambda_n|$ and that $x_i \in \mathbb{R}$ is the eigenvector associated with $\lambda_i$. Then it can be stated that: $A=\sum_{i=1}^{n} \lambda_i x_i x_i^T$. Further, it follows that $A^k = \sum_{i=1}^{n} \lambda_i x_i x_i^T$, since raising A to the $k^{th}$ power, $k \in \mathbb{N}$ leaves the eigenvectors unchanged and transforms $\lambda_i$ to $\lambda_i^k$. Thus, for any $x \in \mathbb{R}^n$, we have $$A^k x = \lambda_1^k \left( \sum_{i=1}^{n} \frac{\lambda_i^k}{\lambda_1^k} x_i \gamma_i \right),$$

where $\gamma_i = x_i^T x$. We see that if $|\lambda_1| > |\lambda_2|$, then as $k \to \infty$, $A_x^k$ points only towards the dominant direction (e.g., dominant eigenvector $x_1$), since $$\frac{\lambda_i^k}{\lambda_1^k}$$

converges to zero for any i≠1. At the same time, for any approximate eigenvector x≈$x_1$, the Rayleigh quotient value $$\bar{\lambda}_1 = \frac{x^T A x}{x^T x}$$

denotes an increasingly more accurate approximation of the eigenvalue $\lambda_1$.

Furthermore, in some embodiments, the eigenpair determination control process 142 implements a matrix deflation process in conjunction with the power iteration process to compute additional eigenpairs of a given diagonalizable matrix A. As noted above, the power iteration process is utilized to compute an estimate of the dominant eigenvector $x_1$ which in turn allows the eigenpair determination control process 142 to compute an estimate of the corresponding dominant eigenvalue $\lambda_1$ via any suitable process, such as the Rayleigh quotient, etc. If no other eigenpairs of the matrix A are needed to be determined, the power iteration process terminates with a computation of the dominant eigenpair ($\lambda_1$, $x_1$) of the matrix A. On the other hand, if one or more one additional eigenpairs (e.g., ($\lambda_2$, $x_2$), ($\lambda_3$, $x_3$), . . . , ($\lambda_n$, $x_n$)) of the n×n matrix A are to be determined, the eigenpair determination control process 142 implements a matrix deflation process to compute a deflated matrix to enable the computation of a dominant eigenpair of the deflated matrix, which corresponds to the next dominant eigenpair (e.g., ($\lambda_2$, $x_2$) of the matrix A, using the power iteration process. An exemplary matrix deflation process will be discussed in further detail below with reference to the exemplary flow diagram FIG. 4B.

Assume that the dominant eigenvector $x_1$ (e.g., normalized eigenvector $x_1$) and corresponding dominant eigenvalue $\lambda_1$ of the matrix A have been determined by the power iteration process. In some embodiments, a matrix deflation process is performed by computing the matrix $\lambda_1 x_1 x_1^T$, and subtracting it from matrix A to generate a deflated matrix D, i.e., $D = A - \lambda_1 x_1 x_1^T$. The deflated matrix D has the same eigenvectors with matrix A, and the same eigenvalues with the difference that the previously computed dominant eigenvalue of A is mapped to zero in the deflated matrix D. In this regard, the next lower eigenvalue of the matrix A becomes the dominant eigenvalue of the deflated matrix D and may be determined by another iteration of the power iteration method.

In general, a matrix deflation operation performed by the eigenpair determination control process is demonstrated as follows. Assume that the dominant eigenvector $x_1$ of a given matrix A is determined using the power iteration process, a deflated matrix D is computed as $D = A - \lambda_1 x_1 x_1^T$. Given that $A - \lambda_1 x_1 x_1^T = (\lambda_1 - \lambda_1) x_1 x_1^T + \sum_{i=2}^{n} \lambda_i x_i x_i^T$, we see that the deflated matrix $D = A - \lambda_1 x_1 x_1^T$ has the same eigenvalues and eigenvectors as the matrix A, except that the eigenvalue $\lambda_1$ of the matrix A is mapped to zero in the deflated matrix D. This means that the second dominant eigenvalue $\lambda_2$ of the matrix A becomes the dominant eigenvalue of the deflated matrix D in that $\lambda_1 = 0$ and $|\lambda_2| \geq |\lambda_3| \geq \ldots |\lambda_n|$. After computing the deflated matrix D, the next dominant eigenpair ($\lambda_2$, $x_2$) of the matrix A is computed by applying the power iteration process to the deflated matrix $D = A - \lambda_1 x_1 x_1^T$.

The same idea is applied to compute the eigenpair ($\lambda_3$, $x_3$) (e.g., third dominant eigenpair of A), etc. In particular, to compute ($\lambda_i$, $x_i$), given that $Ax_i = \lambda_i x_i$, the power iteration process is applied starting with i=1 to compute ($\lambda_1$, $x_1$), and a matrix deflation process is implemented to compute $A_{i+1} = A_i - \lambda_i x_i x_i^T$, wherein i=1, 2, . . . , n-1, and where, e.g., for i=1, $A_1$ denotes the original matrix A with the dominant eigenvalue $\lambda_1$ and where $A_2$ denotes a deflated matrix with a dominant eigenvalue $\lambda_2$ of the original matrix A, etc. In general, given the original matrix A, a deflated matrix $A_{i+1}$ to compute ($\lambda_{i+1}$, $x_{i+1}$) is denoted as follows:

$$A_{i+1} = (((A - \lambda_{i=1} x_{i=1} x_{i=1}^T) - \lambda_{i=2} x_{i=2} x_{i=2}^T) - \ldots - \lambda_{i-1} x_{i-1} x_{i-1}^T).$$

In other words, following the initial power iteration process to compute the dominant eigenpair ($\lambda_1$, $x_1$), a matrix deflation process and power iteration process are performed for a given number of iterations to compute one or more or all eigenpairs of the matrix A, as desired. As explained in further detail below, in accordance with exemplary embodiments of the disclosure, hardware accelerated computing is utilized (via, e.g., an RPU computing system) to perform an outer product update operation to compute a deflated matrix by (i) computing an outer product a first vector $\lambda_i x_i$ and a second vector $x_i^T$ and (ii) update the values of the matrix currently residing in the RPU array(s) based on the result of the output product of the first and second vectors to thereby obtain a deflated matrix stored in the RPU array(s). Thereafter, a power iteration process is applied by performing matrix-vector operations using the deflated matrix stored in the RPU array(s) to compute a next dominant eigenvector and associated eigenvalue.

In some embodiments, the eigenpair determination control process 142 implements an "inverse power iteration" method to determine the smallest eigenvalue(s) (absolute magnitude) of a given matrix A, wherein a power iteration process is applied to an inverse matrix $A^{-1}$. In this instance, to compute the eigenvalues of the smallest modulus, i.e., those closest to zero, the eigenpair determination control process 142 invokes the matrix inversion process 144 to compute an estimate of the inverse matrix $A^{-1}$. The inverse power iteration process is based on the eigenvalue equation Ax=λx rewritten as $$A^{-1} x = \left(\frac{1}{\lambda}\right) x.$$

Applying the power iteration process converges the initial vector to the eigenvector corresponding to the largest value of $$\left(\frac{1}{\lambda}\right)$$

of the inverse matrix $A^{-1}$, which is the smallest value of λ of the matrix A.

As schematically illustrated in FIG. 1, the matrix inversion process 144 implements methods that are configured to compute an estimate inverse matrix $A^{-1}$ of the matrix A provided by the application 110, and store the estimated inverse matrix $A^{-1}$ in the RPU array(s) 134). The eigenpair determination control process 142 will operate on the estimated inverse matrix $A^{-1}$ to compute, in the first iteration of the inverse power iteration process, the smallest eigenpair of the matrix A. In some embodiments, the matrix inversion process is performed in the digital domain using any suitable process to compute an estimate of the inverse matrix $A^{-1}$ of the matrix A. For example, in some embodiments, the matrix inversion process 144 is implemented using a Neuman series process and/or a Newton iteration process to compute an approximation of the inverse matrix $A^{-1}$, exemplary methods of which are known to those of ordinary skill in the art, the details of which are not needed to understand the exemplary eigenpair computation techniques as described herein.

In some embodiments, the matrix inversion process 144 implements the hardware acceleration computing techniques as disclosed in U.S. patent application Ser. No. 17/134,814, filed on Dec. 29, 2020, entitled: Matrix Inversion Using Analog Resistive Crossbar Array hardware, which is commonly assigned and fully incorporated herein by reference. U.S. patent application Ser. No. 17/134,814 discloses techniques to perform a matrix inversion process which comprises, e.g., (i) storing a first estimated inverse matrix of the given matrix A in one or more of the RPU array(s) 134, and (ii) performing a first iterative process on the first estimated inverse matrix stored in the array of RPU cells to converge the first estimated inverse matrix to a second estimated inverse matrix of the given matrix. In some embodiments, the first iterative process comprises a stochastic gradient descent optimization process which comprises utilizing row vectors of the given matrix A as training data to train the first estimated inverse matrix stored in the array of RPU cells and update matrix values of the first estimated inverse matrix stored in the array of RPU cells by utilizing error vectors that are determined based on matrix values of an identity matrix. Further details of the matrix inversion process flow are described in the U.S. patent application Ser. No. 17/134,814, which is incorporated herein by reference.

As schematically shown in FIG. 1, during the execution of the application 110, the application 110 may invoke the eigenpair computation process 140 to compute one or more eigenpairs of a given matrix A which is provided to the matrix inversion process 140. In some embodiments, the matrix A comprises a symmetric matrix or symmetric positive definite (SPD) matrix. A symmetric matrix is a square matrix that is equal to its transpose. An SPD matrix is a square symmetric matrix in which all eigenvalues of the matrix are real and positive, and which has an orthonormal set of n eigenvectors (wherein the eigenvectors corresponding to distinct eigenvalues of a symmetric matrix are orthogonal to each other). SPD matrices arise in many physical and mathematical contexts in which eigen-decompositions of SPD matrices are needed to perform computations. For illustrative purposes, exemplary embodiments of the disclosure will be described herein in the context of symmetric matrices and SPD matrices, although the exemplary techniques discussed herein can be readily applied to non-symmetric matrices.

In some embodiments, the digital processing system 120 controls the execution of eigenpair computation process 140. As an initial step, upon receiving the matrix A from the application 110 along with a request to compute eigenpair(s) of the given matrix A, the eigenpair computation process 140 will configure one or more neural cores 132 and associated RPU arrays 134 of the neuromorphic computing system 130 to provide hardware acceleration support for the eigenpair computation process. In addition, the eigenpair computation process 140 will communicate with the neuromorphic computing system 130 to store the matrix A in one or more RPU arrays 134 of the neural cores 132. In some embodiments, if an inverse matrix $A^{-1}$ is needed for the computation, the eigenpair computation process 140 will invoke the matrix inversion process 144 to compute an approximate inverse matrix $A^{-1}$ of the received matrix A, and store the inverse matrix $A^{-1}$ in one or more of the RPU arrays 134 of the one or more neural cores 132 which are configured to support the eigenpair computation process. Thereafter, the eigenpair determination control process 142 performs a numerical iterative process comprising, e.g., a power iteration process, an inverse power iteration process, and/or a matrix deflation process, etc., as needed to compute one or more eigenpairs of the matrix A. Details of exemplary embodiments of eigenpair computation methods will be discussed in further detail below.

Figure 2:
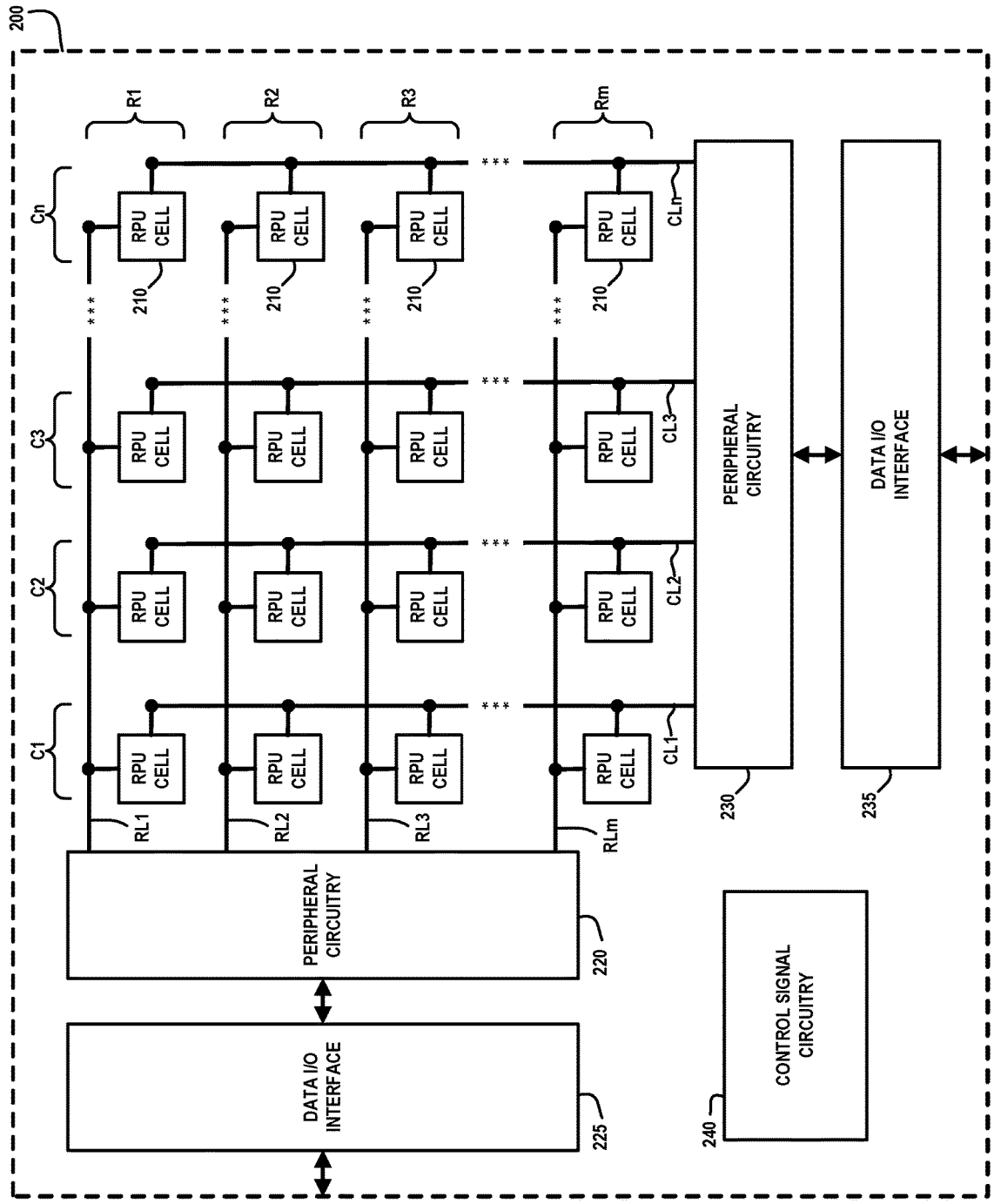
FIG. 2 schematically illustrates a RPU computing system which can be implemented in the system of FIG. 1 to provide hardware accelerated computing of eigenpairs of a matrix, according to an exemplary embodiment of the disclosure.

FIG. 2 schematically illustrates an RPU computing system which can be implemented in the system of FIG. 1 to provide hardware accelerated computing of eigenpairs of a matrix, according to an exemplary embodiment of the disclosure. For example, FIG. 2 schematically illustrates an exemplary embodiment of a neural core 132 and associated RPU array(s) 134 of the neuromorphic computing system 130 of FIG. 1. More specially, FIG. 2 schematically illustrates an RPU system 200 (e.g., neuromorphic computing system) which comprises a two-dimensional (2D) crossbar array of RPU cells 210 arranged in a plurality of rows R1, R2, R3, . . . , Rm, and a plurality of columns C1, C2, C3, . . . , Cn. The RPU cells 210 in each row R1, R2, R3, . . . , Rm are commonly connected to respective row control lines RL1, RL2, RL3, . . . , RLm (collectively, row control lines RL). The RPU cells 210 in each column C1, C2, C3, . . . , Cn are commonly connected to respective column control lines CL1, CL2, CL3, . . . , CLn (collectively, column control lines CL). Each RPU cell 210 is connected at (and between) a cross-point (or intersection) of a respective one of the row and column control lines. In an exemplary embodiment, the number of rows (m) and the number of columns (n) are the same (i.e., n=m). For example, in some embodiments, the computing system 200 comprises a 4,096×4,096 array of RPU cells 210.

The computing system 200 further comprises peripheral circuitry 220 connected to the row control lines RL1, RL2, RL3, . . . , RLm, as well peripheral circuitry 230 connected to the column control lines CL1, CL2, CL3, . . . , CLn. Further, the peripheral circuitry 220 is connected to a data input/output (I/O) interface block 225, and the peripheral circuitry 230 is connected to a data I/O interface block 235. The computing system 200 further comprises control signal circuitry 240 which comprises various types of circuit blocks such as power, clock, bias and timing circuitry to provide power distribution and control signals and clocking signals for operation of the peripheral circuitry 220 and 230 of the computing system 200.

In some embodiments, each RPU cell 210 in the computing system 200 comprises a resistive element with a conductance value that is tunable. During operation, some or all of the RPU cells 210 in the computing system 200 comprise respective conductance values that are mapped to respective numerical matrix values of a given matrix A received or an approximate inverse matrix $A^{-1}$ that is stored in the array of RPU cells 210. In some embodiments, the resistive elements of the RPU cells 210 are implemented using resistive devices such as resistive switching devices (interfacial or filamentary switching devices), ReRAM, memristor devices, phase change memory (PCM) device, etc.) and other types of devices which have a tunable conductance (or tunable resistance level) which can be programmatically adjusted within a range of a plurality of different conductance levels to tune the weight of the RPU cell 210. In some embodiments, the variable conductance elements of the RPU cells 210 can be implemented using ferroelectric devices such as ferroelectric field-effect transistor devices. Furthermore, in some embodiments, the RPU cells 210 can be implemented using an analog CMOS-based framework in which each RPU cell 210 comprises a capacitor and a read transistor. With the analog CMOS-based framework, the capacitor serves as a memory element of the RPU cell 210 and stores a weight value in the form a capacitor voltage, and the capacitor voltage is applied to a gate terminal of the read transistor to modulate a channel resistance of the read transistor based on the level of the capacitor voltage, wherein the channel resistance of the read transistor represents the conductance of the RPU cell and is correlated to a level of a read current that is generated based on the channel resistance.

While the row control lines RL and column control lines CL are each shown in FIG. 2 as a single line for ease of illustration, it is to be understood that each row and column control line can include two or more control lines connected to the RPU cells 210 in the respective rows and columns, depending on the implementation and the specific architecture of the RPU cells 210. For example, in some embodiments, each row control line RL can include a complementary pair of word lines for a given RPU cell 210. Moreover, each column control line CL may comprise multiple control lines including, e.g., one or more source lines (SL) and one or more bit lines (BL).

The peripheral circuitry 220 and 230 comprises various circuit blocks which are connected to the respective rows and columns in the 2D array of RPU cells 210, and which are configured to perform various analog, in-memory computation operations such as vector-matrix multiply functions, matrix-vector multiply functions, and outer product update operations, etc., to provide hardware accelerated computation of eigenpairs of a given matrix A, according to exemplary embodiments of the disclosure. For example, in some embodiments, to support RPU cell read/sensing operations (e.g., read a weight value of a given RPU cell 210), the peripheral circuitry 220 and 230 comprises pulse-width modulation (PWM) circuitry and read pulse driver circuitry, which is configured to generate and apply PWM read pulses to the RPU cells 210 in response to digital input vector values (read input values) received during different operations. More specifically, in some embodiments, the peripheral circuitry 220 and 230 comprises digital-to-analog (D/A) converter circuitry that is configured to receive a digital input vector (to be applied to rows or columns) and convert the elements of the digital input vector into analog input vector values that are represented by input voltage voltages of varying pulse width. In some embodiments, a time-encoding scheme is used when input vectors are represented by fixed amplitude Vin=1V pulses with a tunable duration (e.g., pulse duration is a multiple of 1 ns and is proportional to the value of the input vector). The input voltages applied to rows (or columns) generate output vector values which are represented by output currents, wherein the stored weights/values of the RPU cells 210 are essentially read out by measuring the output currents.

The peripheral circuitry 220 and 230 further comprises current integrator circuitry and analog-to-digital (A/D) converter circuitry to integrate read currents (IEAD) which are output and accumulated from the connected RPU cells 210 and convert the integrated currents into digital values (read output values) for subsequent computation. In particular, the currents generated by the RPU cells 210 are summed on the columns (or rows) and the summed current is integrated over a measurement time, tmeas, by current readout circuitry of the peripheral circuitry 220 and 230. The current readout circuitry comprises current integrators and analog-to-digital (A/D) converters. In some embodiments, each current integrator comprises an operational amplifier that integrates the current output from a given column (or row) (or differential currents from pairs of RPU cells implementing negative and positive weights) on a capacitor, and an analog-to-digital (A/D) converter converts the integrated current (e.g., an analog value) to a digital value.

The data I/O interfaces 225 and 235 are configured to interface with a digital processing core, wherein the digital processing core is configured to process input/outputs to the RPU system 200 (e.g., neural core) and route data between different RPU arrays. The data I/O interfaces 225 and 235 are configured to (i) receive external control signals and data from a digital processing core and provide the received control signals and data to the peripheral circuitry 220 and 230, and (ii) receive digital read output values from peripheral circuitry 220 and 230, and send the digital read output values to a digital processing core for processing.

Figure 4A:
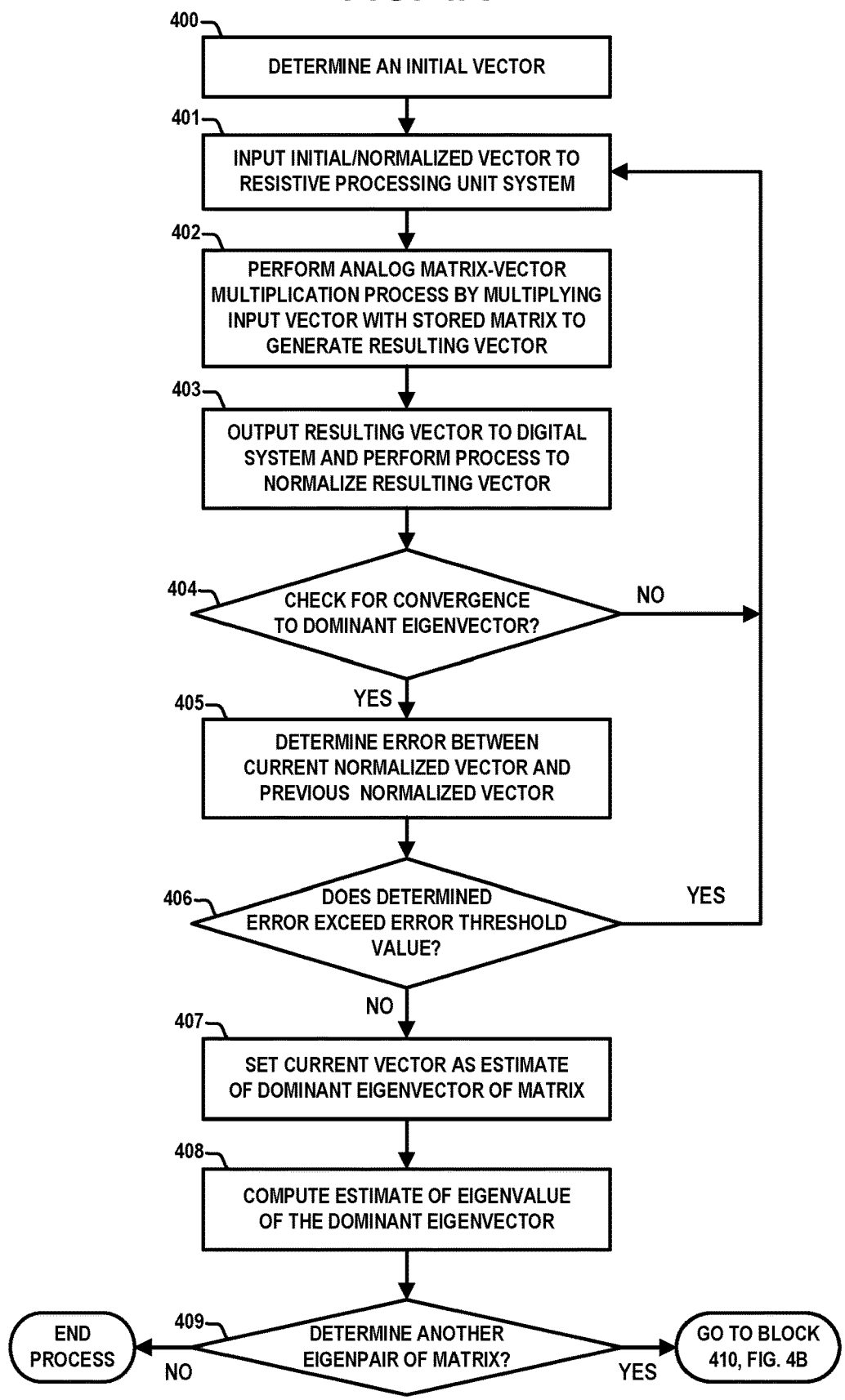

FIGS. 3, 4A, and 4B illustrate methods for performing an eigenpair computation process according to exemplary embodiments of the disclosure. In particular, FIG. 3 illustrates a high-level process flow for computing eigenpairs which, in some embodiments, is implemented by the computing system 100 of FIG. 1. During run-time execution of a given application, the application may need to perform some computations that require, e.g., eigen-decomposition of a given matrix A. The computing system 100 will receive a request from the given application to determine one or more eigenpairs of the given matrix A (block 300). The request will include the values of the matrix A. In some embodiments, the matrix A comprises a symmetric matrix, e.g., n×n matrix, with n rows and n columns, where n can be relatively large (e.g., 100 or greater). In some embodiments, the symmetric matrix A comprises an SPD matrix. The computing system 100 invokes an eigenpair computation process (e.g., process 140, FIG. 1) to compute eigenpairs of the given matrix A.

In some embodiments, the invocation of the eigenpair computation process comprises an initial process of configuring the neuromorphic computing system 130 (e.g., RPU system) to perform hardware accelerated computation operations that will be needed to perform the eigenpair computation process (block 301). For example, in some embodiments, the digital signal processing system 120 communicates with a programming interface of the neuromorphic computing system 130 to configure one or more neurons and a routing system of the neuromorphic computing system 130 to allocate and configure one or more neural cores to (i) implement one or more interconnected RPU arrays for storing matrix values of the given matrix A or an estimated inverse matrix $A^{-1}$ and to (ii) perform in-memory computations (e.g., matrix-vector computations, outer product computations, etc.) using the stored matrix A or the estimated inverse matrix $A^{-1}$, as will be discussed in further detail below.

In some embodiments, the number of RPU arrays that are allocated and interconnected will vary depending on the size of the matrix A and the size of the RPU arrays. For example, if each RPU array has a size of 4096×4096, then one RPU array can be configured to store the values of a given n×n matrix A, or an estimated inverse matrix $A^{-1}$ of the given matrix A, where n is 4096 or less. In some embodiments, when the given n×n matrix A is smaller than the physical RPU on which the n×n matrix A is stored, any unused RPU cells can be set to zero and/or unused inputs to the RPU array can be padded by "zero" voltages. In some embodiments, when the size of the given n×n matrix A is greater than the size of a single RPU array, then multiple RPU arrays can be operatively interconnected to form an RPU array which is large enough to store the values of the given n×n matrix A, or the estimated inverse matrix $A^{-1}$ of the given n×n matrix A.

Next, a determination is made as to whether the inverse matrix $A^{-1}$ of the given matrix A is needed for the eigenpair computation process (block 302). For example, as noted above, when the eigenpair computation process is performed (e.g., power iteration process) to determine a dominant eigenpair of the given matrix A, the eigenpair computation process will be performed using the given matrix A. On the other hand, when the eigenpair computation process is performed (e.g., inverse power iteration process) to determine a smallest eigenpair of the given matrix A, the eigenpair computation process is preferably performed using the inverse matrix $A^{-1}$ the given matrix A. Accordingly, if it is determined that the inverse matrix $A^{-1}$ of the given matrix A is not needed for the eigenpair computation process (negative determination in block 302), the digital signal processing system 120 will proceed to communicate with the neuromorphic computing system 130 to store the given matrix A on the allocated RPU array(s) of the configured neural core(s) (block 303).

On the other hand, if it is determined that the inverse matrix $A^{-1}$ of the given matrix A is needed for the eigenpair computation process (affirmative determination in block 302), in some embodiments, the digital signal processing system 120 will proceed perform a matrix inversion process to determine an approximate inverse matrix $A^{-1}$ of the given matrix A (block 304) and then store the approximate inverse matrix $A^{-1}$ on the allocated RPU array(s) of the configured neural core(s) (block 303). As noted above, the approximate inverse matrix $A^{-1}$ is determined by operation of the matrix inversion process 144 (FIG. 1). In some embodiments, the matrix inversion process 144 performs a Neumann series inversion process in the digital domain to estimate the inverse matrix $A^{-1}$. In some embodiments, the matrix inversion process 144 utilizes the hardware accelerated matrix inversion computing techniques as disclosed in U.S. patent application Ser. No. 17/134,814.

Once the matrix A or the estimated inverse matrix $A^{-1}$ has been stored in the RPU array(s), an eigenpair computation process is performed to compute eigenpairs of the stored matrix (block 305) wherein the eigenpair computation process comprises utilizing the RPU system to perform various hardware computations on the stored matrix such as, e.g., matrix-vector computations to compute eigenvectors, and outer product computations to update values of the stored matrix, etc. In some embodiments, eigenpair computation process (block 305) is implemented using the exemplary process flow and computations as discussed in further detail below in conjunction with FIGS. 4A, 4B, 5A, 5B, 6A, 6B, and 7. Upon completion of the eigenpair computation process, the computing system will return the determined eigenpair(s) to the requesting application (block 306).

Referring now to FIGS. 4A and 4B, an exemplary eigenpair computation process is shown in which a power iteration process and a matrix deflation process are utilized to compute eigenpairs of a matrix, according to an exemplary embodiment of the disclosure. In particular, FIG. 4A illustrates a power iteration process to compute a dominant eigenpair of a given matrix A, and FIG. 4B illustrates a matrix deflation process which is utilized in conjunction with the power iteration process of FIG. 4A to compute a deflated matrix to enable the computation of a dominant eigenpair of the deflated matrix. For illustrative purposes, the process flow of FIGS. 4A and 4B will be discussed in the context of performing a power iteration process under circumstances in which the given matrix A is stored in the RPU array, as opposed to an inverse power iteration process which is applied to an inversive matrix $A^{-1}$ stored in the RPU array.

Referring initially to FIG. 4A, a first step of the power iteration process is to determine (in the digital domain) an initial vector $x^{(0)}$ (block 400). In some embodiments, the initial vector $x^{(0)}$ comprises an n×1 column vector which is an estimate of the dominant eigenvector that corresponds to the dominant eigenvalue. In some embodiments, the initial vector $x^{(0)}$ is a random vector having a Euclidean norm that is equal to 1. Formally, in the digital domain, the process generates an initial random vector $x^{(0)} \in \mathbb{R}$ such that $\|x^{(0)}\|_2 = 1$. For example, in an exemplary embodiment, the initial random vector $x^{(0)} = (x_1, x_2, \ldots, x_n) = (1, 1, \ldots, 1)$, wherein the Euclidean norm of $x^{(0)}$ is $\|x^{(0)}\|_2 = \sqrt{x_1^2 + x_2^2 + \ldots + x_n^2} = 1$. In this example, a transpose T of the initial column vector $x^{(0)}$ is represented by the row vector $x^{(0)} = [1, 1, \ldots, 1]^T$ (which is a 1×n row vector). When the initial vector $x^{(0)}$ is generated as an estimate of the dominant eigenvector, the initial vector $x^{(0)}$ can be normalized to generate an initial column vector as follows:

$$x^{(0)} = \frac{x^{(0)}}{\|x^{(0)}\|_2}.$$

Next, the initial column vector $x^{(0)}$ is input to the RPU system (block 401) and an iterative eigenvector computation process is performed to estimate a dominant eigenvector corresponding to the dominant eigenvalue. For the initial iteration, the RPU system performs an analog matrix-vector multiplication process by multiplying the initial vector $x^{(0)}$ and the stored matrix A in the RPU array(s) to generate a resulting vector (which is an n×1 column vector) as the product of matrix-vector multiplication operation (block 402). In particular, for the $j^{th}$ iteration, the matrix-vector operation (in block 402) is computed as follows: $x^{(j+1)} = Ax^{(j)}$. For the initial iteration, the iteration index j is set equal to zero (i.e., j=0) such that for the initial iteration, the resulting vector $x^{(1)}$ is computed as: $x^{(1)} = Ax^{(0)}$. Following the $j^{th}$ iteration, $x^{(j+1)}$ denotes an approximation of the dominant eigenvector $x_1$.

The resulting vector $x^{(j)}$ is output from the RPU system to the digital processing system wherein a normalization process is performed in the digital domain to normalize the resulting vector $x^{(1)}$. In some embodiments, the normalization process is performed using a Euclidean norm (or 2-norm) operation. More specifically, for the $j^{th}$ iteration, the resulting vector $x^{(j+1)}$ is normalized as follows: $x^{(j+1)} = x^{(j+1)}/\|x^{(j+1)}\|_2$. For the initial iteration (j=0), the resulting vector $x^{(1)}$ is normalized as follows: $x^{(1)} = x^{(1)}/\|x^{(1)}\|_2$. It is to be understood that other normalization methods can be utilized. For example, in some embodiments, a maximum norm operation can be performed whereby the resulting vector is normalized by dividing the resulting vector by the largest element of the resulting vector (i.e., the element with the maximum absolute value) so that the largest element in the resulting vector is reduced to unity.

Next, a determination is made as to whether the system should check for convergence to the dominant eigenvector (block 404). In some embodiments, the determination is made based on the number of iterations of the power iteration process which have been performed following a previous convergence check operation. For example, in some embodiments, a convergence check operation can be performed for every p iterations of the power iteration process, wherein p can be 1, 2, 3, 4, 5, etc. In some embodiments, an initial convergence check operation can be performed following the first p iterations (e.g., p=5), wherein a convergence check operation is then performed after each iteration of the power iteration process until a convergence criterion has been met.

If it is determined that a convergence check operation is not to be performed for the given iteration (negative determination in block 404), the process flow continues with the next iteration by inputting the current normalized vector to the RPU system (block 401) and performing an analog matrix-vector multiplication process by multiplying the current normalized vector with the stored matrix A in the RPU array(s) to generate a resulting updated vector as the product of matrix-vector multiplication operation (block 402). For example, following the initial iteration (j=0) in which the resulting vector $x^{(1)}$ was computed, the next iteration (j=j+1=1) includes performing the matrix-vector operation $x^{(j+1)}=Ax^{(j)}$ (in block 402) to compute $x^{(2)}$ as follows: $x^{(2)}=Ax^{(1)}$. The resulting vector $x^{(2)}$ is then output from the RPU system and normalized in the digital domain (block 403). Again, the iterative process continues until the convergence criterion is met.

On the other hand, when it is determined that a convergence check operation is to be performed for the current iteration (affirmative determination in block 404), the convergence check operation is performed to determine if the current resulting vector has converged to the dominant eigenvector within a given error tolerance. For example, in some embodiments, the convergence check operation comprises determining an error between the current normalized vector and the previous (last) normalized vector (block 405) and determining whether the error exceeds an error threshold value (block 406). In some embodiments, the error is estimated as follows: $err=\|I-x^{(j)}(x^{(j)})^T) \, x^{(j+1)}\|_2$, where I denotes the identity matrix.

For example, after the 5$^{th}$ iteration (j=4), an error value (err), between the current estimate $x^{(5)}$ of the dominant eigenvector and the previous estimate $x^{(4)}$ of the dominant eigenvector is computed as: $err=\|(I-x^{(4)}(x^{(4)})^T)x^{(5)}\|_2$. After a given number of iterations, the current estimate $x^{(j+1)}$ of the dominant eigenvector becomes proportional to the actual dominant eigenvalue $x_1$, such that the ratio between corresponding elements of $x^{(j+1)}$ and $x^{(j)}$ approaches the dominant eigenvalue $\lambda_1$.

The determined error value (err) value is compared to an error threshold value $\epsilon$ (or error tolerance) to determine whether the error exceeds the error threshold value $\epsilon$, e.g., to determine if err≤E. In some embodiments, the error threshold value $\epsilon$ is set to a value on the order of $1\times10^{-4}$ or smaller. The error threshold value $\epsilon$ can be selected to be any desired value depending on the application. For example, the error threshold value $\epsilon$ can be set to a value such that the current estimate of the dominant eigenvector is accurate to, e.g., three, four, five, six decimal places of the actual dominant eigenvector.

It is to be understood that the error value (in block 405) can be determined using other computations in the digital domain. For example, in some embodiments, after a given iteration in which a current estimate $x^{(j+1)}$ of the dominant eigenvector is computed (in the analog domain) and normalized, a Rayleigh quotient computation can be performed (in the digital domain) using the digital matrix A and $x^{(j+1)}$ to compute a current eigenvalue $\lambda^{(j+1)}$ which corresponds to the current estimate $x^{(j+1)}$ of the dominant eigenvector as follows: $\lambda^{(j+1)}=(x^{(j+1)})^T A x^{(j+1)}$. An error value (err) is then determined by computing (in the digital domain) $\|Ax^{(j+1)}-\lambda^{(j+1)}x^{(j+1)}\|_2$. If err≤$\epsilon$, then $\lambda^{(j+1)}x^{(j+1)}$ is deemed to be sufficiently close to $Ax^{(j+1)}$.

Referring back to FIG. 4A, if the determined error does exceed the error threshold value (affirmative determination in block 406), the convergence criterion is not met (i.e., the current estimated eigenvector $x^{(j+1)}$ has not converged to the dominant eigenvector), and another iteration of the power iteration process is performed (i.e., j=j+1, and return to block 401). On the other hand, if the determined error does not exceed the error threshold value (negative determination in block 406), it is determined that the convergence criterion is met where the current estimated eigenvector $x^{(j+1)}$ is deemed to have converged to the dominant eigenvector. In this instance, the current estimated eigenvector $x^{(j+1)}$ is deemed the final estimated dominant eigenvector $x_i$ of the matrix A (block 407). The estimated dominant eigenvector $x_i$ is then utilized to compute an estimate of the dominant eigenvalue $\lambda_1$ (block 408). In some embodiments, an estimate of the dominant eigenvalue $\lambda_1$ is computed (in the digital domain) using, e.g., a Rayleigh quotient computation as follows:

$$\lambda_1 \approx \frac{(x^{(j+1)})^T A x^{(j+1)}}{(x^{(j+1)})^T x^{(j+1)}},$$

wherein the estimated eigenvalue $\lambda_1$ comprises a Rayleigh quotient value.

The final steps (blocks 407 and 408) of the power iteration process result in an estimate of the dominant eigenpair $(\lambda_1, x_1)$ of the matrix A. If no other eigenpairs of the matrix A are needed to be determined (negative determination in block 409), the power iteration process terminates, and the dominant eigenpair $(\lambda_1, x_1)$ of the matrix A can be returned to the requesting application (e.g., block 306, FIG. 3). On the other hand, if one or more one additional eigenpairs (e.g., $(\lambda_2, x_2), (\lambda_3, x_3), \ldots, (\lambda_n, x_n)$) of the n×n matrix A are to be determined (affirmative determination in block 409), then the process flow proceeds to block 410, of FIG. 4B. As noted above, FIG. 4B illustrates a matrix deflation process which is utilized in conjunction with the power iteration process of FIG. 4A to compute a deflated matrix to enable the computation of a dominant eigenpair of the deflated matrix, which corresponds to the next dominant eigenpair (e.g., $(\lambda_2, x_2)$ of the matrix A.

More specifically, referring to FIG. 4B, initial steps of the matrix deflation process comprise generating a first vector U (in the digital domain) by multiplying the estimated eigenvector and eigenvalue of the previously estimated eigenpair (block 410), and generating a second vector V (in the digital domain) by transposing the previously estimated dominant eigenvector (block 411). For example, assuming that the previously estimated eigenpair is the estimated dominant eigenpair $(\lambda_1, x_1)$ of the matrix A, the first vector U is generated by scaling the values of the estimated dominant eigenvector $x_1$ with the estimated dominant eigenvalue $\lambda_1$ to thereby generate a n×1 column vector, i.e., $U=\lambda_1 x_1 = (\lambda_1 v_1, \lambda_1 v_2, \ldots, \lambda_1 v_n) = (u_1, u_2, \ldots, u_n)$, where $v_i$ denotes the $i^{th}$ element of the estimated dominant eigenvector $x_1$ (i=1, 2, ..., n). In addition, the second vector V is generated by transposing the estimated dominant eigenvector $x_1$ to thereby generate a 1×n row vector $V=x_1^T=[v_1, v_2, \ldots, v_n]$.

The first and second vectors are then input to the RPU system (block 412), and the RPU system proceeds to perform an analog outer product of the first and second vectors U and V to update the matrix values of the matrix A stored in the RPU array(s) and thereby generate a deflated matrix D in the RPU array(s) (block 413). For example, assuming that the previously estimated eigenpair is the estimated dominant eigenpair ($\lambda_1$, $x_1$) of the matrix A, a deflated matrix D is computed as D=A–$\lambda_1$ $x_1 x_1^T$=A–(U⊗V), wherein the deflated matrix D has the same eigenvalues and eigenvectors as matrix A, except with the dominant eigenvalue $\lambda_1$ of the matrix A is mapped to zero in the deflated matrix D. The outer product U⊗V yields an n×n matrix $A_1$ which is subtracted from the n×n matrix A to generate the deflated n×n matrix $D_1$. For example, for illustrative purposes, assuming n=3, the outer product U⊗V yields a 3×3 matrix $A_1$ as follows:

$$A_1 = U \oplus V = \begin{bmatrix} u_1 \\ u_2 \\ u_3 \end{bmatrix} \begin{bmatrix} v_1 & v_2 & v_3 \end{bmatrix} = \begin{bmatrix} u_1 v_1 & u_1 v_2 & u_1 v_3 \\ u_2 v_1 & u_2 v_2 & u_2 v_3 \\ u_3 v_1 & u_3 v_2 & u_3 v_3 \end{bmatrix}.$$

The outer product update process (block 414) of the form A=: A–$\lambda_j$ $x_j$ $x_j^T$ (or $D_1$=A–$A_1$) is performed in analog hardware, by updating (via a suitable outer-product update operation) the matrix which currently resides in the RPU array. For the first iteration of the matrix deflation process, the original matrix A residing in the RPU array is updated to generate the first deflated matrix D in which the estimated dominant eigenvalue $\lambda_1$ is set to zero, but which comprises the eigenvalues $A_2$, $A_3$, ..., An of the original n×n matrix A.

To compute the next dominant eigenpair (e.g., ($\lambda_2$, $x_2$)) of the original matrix A, the process flow (block 414) returns to block 400 (FIG. 4A), wherein the power iteration process (blocks 400-408) is performed using the updated (deflated) matrix (e.g., D=A–$\lambda_1 x_1 x_1^T$) in the RPU array to determine the next dominant eigenpair of the original matrix A, using the same process as described above. It is to be understood that the power iteration process (FIG. 4A) and the matrix deflation process (FIG. 4B) can be repeated for multiple iterations to compute additional eigenpairs, e.g., ($\lambda_3$, $x_3$), etc., of the original n×n matrix A. In particular, to compute an estimate of the eigenpair ($\lambda_3$, $x_3$) of matrix A, the power iteration process can be applied to a deflated matrix D=A–$\lambda_1 x_1 x_1^T$–$\lambda_2 x_2 x_2^T$, etc.

Figure 5A:
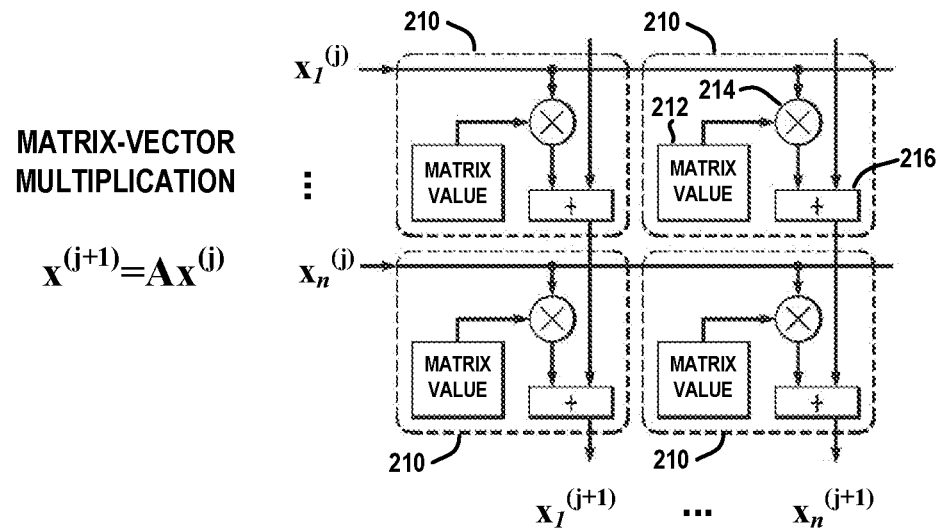
FIG. 5A schematically illustrates a method for performing an analog matrix-vector multiplication operation by an RPU computing system comprising an array of RPU cells to implement hardware accelerated computing of eigenpairs of a matrix, according to an exemplary embodiment of the disclosure.

FIGS. 5A, 5B, 6A and 6B schematically illustrate the analog matrix-vector multiplications and outer product (update) computations that are performed by an RPU system using a matrix stored in an array of RPU cells to implement the process of blocks 401 and 402 (FIG. 4A) and blocks 412 and 413 (FIG. 4B). More specifically, FIG. 5A schematically illustrates a method for performing an analog matrix-vector multiplication operation by an RPU computing system comprising an array of RPU cells to implement hardware accelerated computing of eigenpairs of a matrix, according to an exemplary embodiment of the disclosure. In some embodiments, FIG. 5A schematically illustrates a matrix-vector multiplication operation (e.g., $Ax^{(j)}$ that is performed on matrix values of a matrix which is stored on an array of RPU cells 210 of the computing system 200 of FIG. 2. The conductance values of the RPU cells 210 are mapped to respective matrix elements 212 of a matrix (e.g., matrix A) that is stored in the array of RPU cells 210, and the matrix elements 212 stored in the RPU cells 210 are encoded by the respective conductance values of the RPU cells 210.

Each RPU cell 210 performs a local multiplication operation 214 and a local summation operation 216 to perform an analog matrix-vector multiplication operation (e.g., block 402, FIG. 4A). FIG. 5A illustrates a matrix-vector operation $x^{(j+1)}=Ax^{(j)}$ (in block 402, FIG. 4A), wherein $x^{(j)}=x_1^{(j)}$, $x_2^{(j)}$, ..., $x_n^{(j)}$) denotes a previous estimate of the dominant eigenvector of matrix A from a previous iteration of the power method (or the initial vector), and wherein $x^{(j+1)}=$($x_1^{(j+1)}$, $x_2^{(j+1)}$, ..., $x_n^{(j+1)}$) denotes a current estimate of the dominant eigenvector x of the matrix A, which is generated as a result of the matrix-vector operation for a current iteration of the power iteration method. As schematically illustrated in FIG. 5A, the input vector $x^{(j)}$ is applied to the row lines (or column lines), and the output vector $x^{(j+1)}$ is output on the column lines (or row lines). For ease of illustration, FIG. 5A shows two elements $x_1^{(j)}$ and $x_n^{(j)}$ of the input the input vector $x^{(j)}$ and the corresponding two elements $x_1^{(j+1)}$ and $x_n^{(j+1)}$ of the output vector $x^{(j+1)}$ which are generated as a result of the analog matrix-vector multiplication operation $Ax^{(j)}$.

Figure 5B:
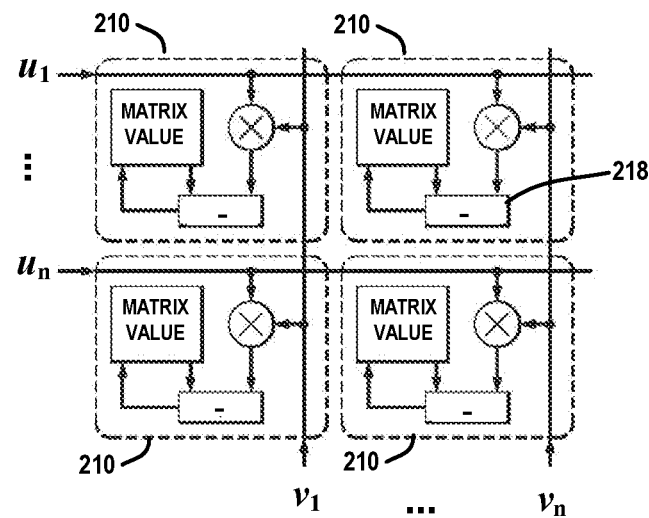
FIG. 5B schematically illustrates a method for performing an analog outer product operation by an RPU computing system comprising an array of RPU cells to implement hardware accelerated computing of eigenpairs of a matrix, according to an exemplary embodiment of the disclosure.

FIG. 5B schematically illustrates a method for performing an analog outer product operation by an RPU computing system comprising an array of RPU cells to implement hardware accelerated computing of eigenpairs of a matrix, according to an exemplary embodiment of the disclosure. More specifically, FIG. 5B schematically illustrates a matrix deflation process which is utilized to perform in-memory computation of a deflated matrix in the RPU array, wherein the deflated matrix is used in conjunction with the power iteration process to compute additional eigenpairs of a given matrix. For illustrative purposes, FIG. 5B schematically illustrates a matrix deflation operation to compute the deflated matrix D=A–$\lambda_1 x_1 x_1^T$=A–U⊗V, based on the estimated dominant eigenpair($\lambda_1$, $x_1$) of matrix A wherein U=$\lambda_1 x_1$=($u_1$, $u_2$, ..., $u_n$), and V=$x_1^T$=($v_1$, $v_2$, ..., $v_n$).

In particular, FIG. 5B schematically illustrates a hardware accelerated in-memory computing process which utilizes the RPU computing system to perform an outer product update operation to compute a deflated matrix D by (i) computing an outer product of a first vector U=$\lambda_1$ $x_1$ and a second vector V=$x_1^T$ and (ii) updating the values of the matrix (e.g., original matrix A) currently residing in the array of RPU cells 210 based on the result of the output product of the first and second vectors to thereby obtain the deflated matrix D which is stored in the array of RPU cells 210. In the exemplary embodiment of FIG. 5B, the outer product operation is performed by applying the elements ($u_1$, $u_2$, ..., $u_n$), of the first vector U=$\lambda_1 x_1$ to the row lines of the RPU array, and applying the elements ($v_1$, $v_2$, ..., $v_n$) of the second vector V=$x_1^T$ to the column lines of the RPU array, wherein a multiplication operation and an incremental weight update are performed locally at each cross-point (RPU cell 210) in the computing system 200 of FIG. 2. The update process is implemented as a matrix subtraction process where the values of the n×n matrix resulting from the outer product U⊗V are subtracted from the matrix values of the matrix A currently residing in the array of RPU cells 210 via subtraction operations 218 that are performed locally in each of the RPU cells 210. For the update process, voltage pulses representing vectors U and V are simultaneously applied to the rows and the columns, wherein each RPU cell 210 performs a local multiplication and subtraction operation by processing the voltage pulses coming from the columns and the rows and hence achieving an incremental weight update and thereby generate a deflated matrix D.

In some embodiments, to determine the product of the first and second vectors U and V for the incremental update process, stochastic translator circuitry in the peripheral circuitry 220 and 230 can be utilized to generate stochastic bit streams that represent the input vectors U and V. The stochastic bits streams for the vectors U and V are applied to the rows and columns in the 2D crossbar array of RPU cells 210, wherein the conductance value of a given RPU cell 210 (and hence, the corresponding matrix value) will change depending on the coincidence of the U and V stochastic pulse streams input to the given RPU cell 210. The vector cross product operations for the update operation are implemented based on the known concept that coincidence detection (using an AND logic gate operation) of stochastic streams representing real numbers is equivalent to a multiplication operation.

FIG. 6A schematically illustrates a method for configuring an RPU computing system comprising an array of RPU cells to perform a matrix-vector operation to implement hardware accelerated computing of eigenpairs of a matrix, according to an exemplary embodiment of the disclosure. In particular, FIG. 6A schematically illustrates an RPU computing system 600 which comprises a crossbar array of RPU cells 605 (or RPU array 605), wherein each RPU cell 610 in the RPU array 605 comprises an analog non-volatile resistive element (represented as a variable resistor having a tunable conductance G) at the intersection of each row (R1, R2, ..., Rn) and column (C1, C2, ..., Cn). As depicted in FIG. 6A, the array of RPU cells 605 provides a matrix of conductance values Gij which are mapped to matrix values of a matrix A or estimated inverse matrix $A^{-1}$, which are encoded by the conductance values Gij (where i represents a row index and j denotes a column index) of the respective RPU cells 610. In an exemplary embodiment, the matrix A is stored in the RPU array 605 wherein the $i^{th}$ row of RPU cells represents the $i^{th}$ row of the matrix A, and wherein the $j^{th}$ column of RPU cells represents the $j^{th}$ column of the matrix A.

To perform a matrix-vector multiplication process for power iteration process (e.g., block 402, FIG. 4A), multiplexers in the peripheral circuitry of the computing system 600 are activated to selectively connect column line driver circuitry 620 to the column lines C1, C2, ..., Cn. The line driver circuitry 620 comprises plurality of digital-to-analog (DAC) circuit blocks 622-1, 622-2, ..., 622-n (collectively DAC circuit blocks 622) which are connected to respective column lines C1, C2, ..., Cn. In addition, multiplexers in the peripheral circuitry of the computing system 600 are activated to selectively connect readout circuitry 630 to the row lines R1, R2, ..., Rn. The readout circuitry 630 comprises a plurality of readout circuit blocks 630-1, 630-2, ..., 630-n, which are connected to respective row lines R1, R2, ..., Rn. The readout circuit blocks 630-1, 630-2, ..., 630-n comprise respective current integrator circuitry 632-1, 632-2, ..., 632-n, and respective analog-to-digital (ADC) circuitry 634-1, 634-2, ..., 634-n. The current integrator circuitry comprises current integrator circuit blocks, wherein each current integrator comprises an operational transconductance amplifier (OTA) with negative capacitive feedback to convert an input current (aggregate column current) to an output voltage on output node of the current integrator circuit, wherein at the end of an integration period, each ADC circuit latches in the output voltage generated at an output node of a respective current integrator circuit quantizes the output voltage to generate a digital output signal.

In the exemplary configuration of FIG. 6A, assuming the matrix A is stored in the RPU array 605 such that the $i^{th}$ row of RPU cells represents the $i^{th}$ row of the matrix A, and the $j^{th}$ column of RPU cells represents the $j^{th}$ column of the matrix A, a matrix-vector multiplication process $x^{(j+1)}=Ax^{(j)}$ (in block 402, FIG. 4A) is performed to compute an updated estimate of a dominant eigenvector for a given matrix A by inputting a digital vector $x^{(j)}=(x_1^{(j)}, x_2^{(j)}, \ldots, x_n^{(j)})$ to the column lines of the RPU array 605. The digital signals $x_1^{(j)}$, $x_2^{(j)}, \ldots, x_n^{(j)}$ are input to respective DAC circuit blocks 622-1, 622-2, ..., 622-m which generate analog voltages $V_1, V_2, \ldots, V_n$ at the input to the respective column lines C1, C2, ..., Cn, which are proportional to the input vector values $x_1^{(j)}, x_2^{(j)}, \ldots, x_n^{(j)}$, respectively. In some embodiments, the DAC circuit blocks 622-1, 622-2, ..., 622-n each comprise pulse-width modulation circuitry and driver circuitry which is configured to generate pulse-width modulated (PWM) read pulses $V_1, V_2, \ldots, V_n$ that are applied to the respective column lines C1, C2, ..., Cn.

More specifically, in some embodiments, the DAC circuit blocks 622-1, 622-2, ..., 622-n are configured to perform a digital-to-analog conversion process using a time-encoding scheme where the input vectors are represented by fixed amplitude pulses (e.g., V=1V) with a tunable duration, wherein the pulse duration is a multiple of a prespecified time period (e.g., 1 nanosecond) and is proportional to the value of the input vector. For example, a given digital input value of 0.5 can be represented by a voltage pulse of 4 ns, while a digital input value of 1 can be represented by a voltage pulse of 80 ns (e.g., a digital input value of 1 can be encoded to an analog voltage pulse with a pulse duration that is equal to the integration time Tmeas). As shown in FIG. 6A, the resulting analog input voltages $V_1, V_2, \ldots, V_n$ (e.g., read pulses), are applied to the array of RPU cells 605 via the column lines C1, C2, ..., Cn.

To perform a matrix-vector multiplication, the analog input voltages $V_1, V_2, \ldots, V_n$ (e.g., read pulses), are applied to the column lines C1, C2, ..., Cn, wherein each RPU cell 610 generates a corresponding read current $I_{READ}=V_j \times G_{ij}$ (based on Ohm's law), wherein $V_j$ denotes the analog input voltage applied to the given RPU cell 610 on the given column j and wherein Gij denotes the conductance value of the given RPU cell 610 (at the given row i and column j). As shown in FIG. 6A, the read currents that are generated by the RPU cells 610 on each row i are summed together (based on Kirchhoff's current law) to generate respective currents $I_1, I_2, \ldots, I_n$ at the output of the respective rows R1, R2, ..., Rn. In this manner, the resulting row currents $I_1, I_2, \ldots, I_n$ represent the result of a matrix-vector multiplication operation that is performed, wherein the matrix A (which is represented by the conductance matrix G of conductance values Gij) is multiplied by the input analog voltage vector $[V_1, V_2, \ldots, V_n]$ to generate and output an analog current vector $[I_1, I_2, \ldots, I_n]$, as illustrated in FIG. 6A. In particular, a given row current $I_i$ is computed as $I_i = \sum_{j=1}^{n} V_j G_{ij}$. For example, the row current $I_i$ for the first row R1 is determined as $I_1=(V_1 G_{11}+V_2 G_{12}+\ldots+V_n G_{1n})$.

The resulting aggregate read currents $I_1, I_2, \ldots, I_n$ at the output of the respective rows R1, R2, ..., Rn are input to respective readout circuit blocks 630-1, 630-2, ..., 630-n of the readout circuitry 630. The aggregate read currents $I_1, I_2, \ldots, I_n$ are integrated by the respective current integrator circuits 632-1, 632-2, ..., 632-n to generate respective output voltages, which are quantized by the respective ADC circuits 634-1, 634-2, ..., 634-n to generate respective digital output signals $x_1^{(j+1)}, x_2^{(j+1)}, \ldots, x_n^{(j+1)}$ of an output vector $x^{(j+1)}$ which represents a current estimate of the dominant eigenvector x of the matrix A, and which is generated as a result of the matrix-vector operation for a current iteration of the power iteration method. The digital output signals $x_1^{(j+1)}, x_2^{(j+1)}, \ldots, x_n^{(j+1)}$ are transmitted to the digital processing system and normalized.

The exemplary embodiment of FIG. 6A schematically illustrates a process for performing a matrix-vector multiplication operation (Ax) wherein (i) the matrix A is stored in the RPU array 605 such that the it row of RPU cells represents the i*row of the matrix A, and the $j^1$ column of RPU cells represents the $j^{th}$ column of the matrix A, (ii) the vector x is input to the columns, and (iii) the resulting vector is generated at the output of the rows. In other embodiments, the same matrix-vector multiplication operation (Ax) can be performed by (i) storing a transpose matrix $A^T$ of the matrix A in the RPU array 605 such that the i*row of the matrix A is stored in the RPU array 605 as the j column of the transpose a transpose matrix $A^T$, (ii) applying the input vector x to the rows, and (iii) reading the resulting vector at the output of the columns.

Figure 6B:
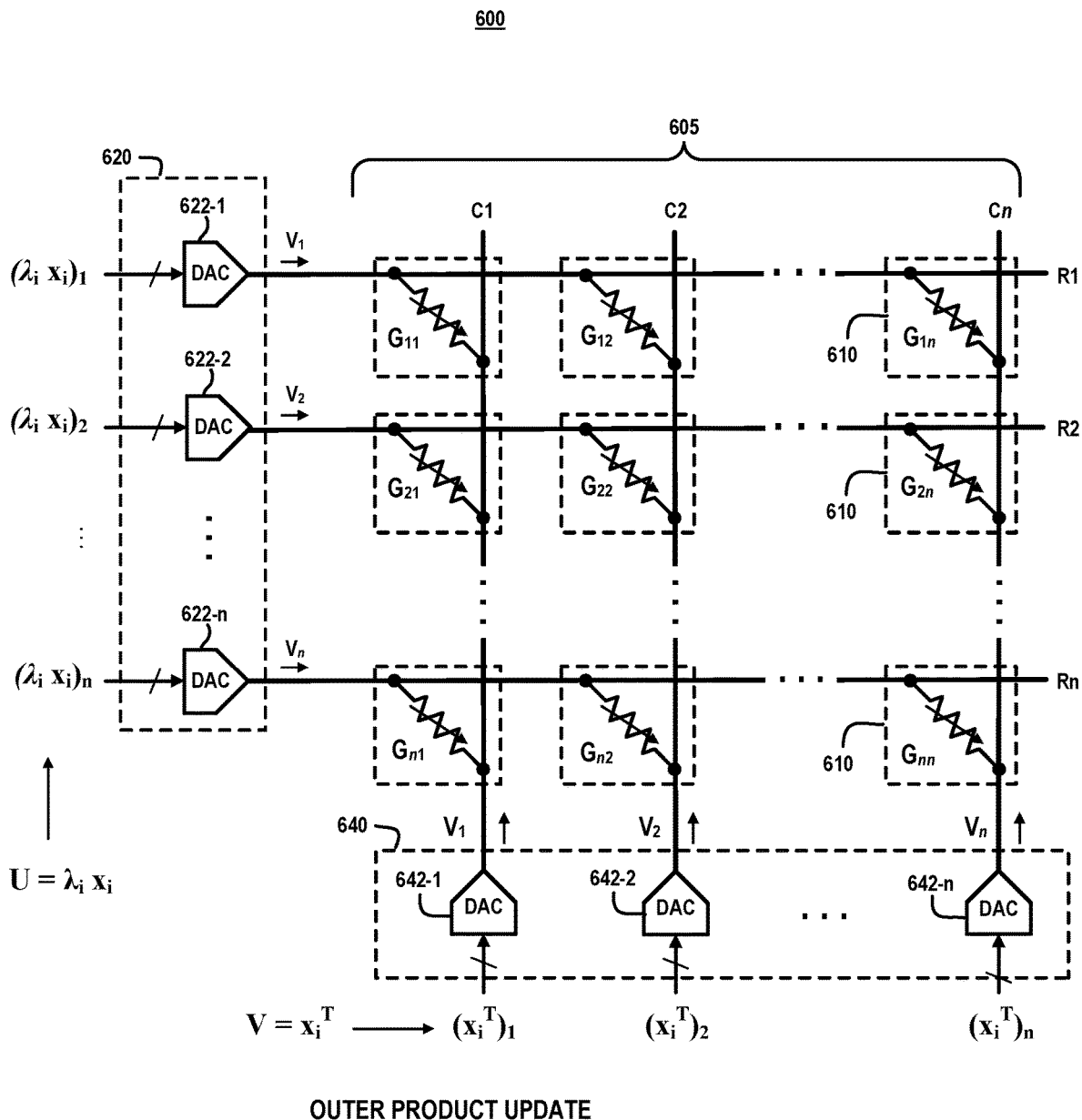
FIG. 6B schematically illustrates a method for configuring an RPU computing system comprising an array of RPU cells to perform an analog outer product operation to implement hardware accelerated computing of eigenpairs of a matrix, according to an exemplary embodiment of the disclosure.

FIG. 6B schematically illustrates a method for configuring an RPU computing system comprising an array of RPU cells to perform an analog outer product operation to implement hardware accelerated computing of eigenpairs of a matrix, according to an exemplary embodiment of the disclosure. More specifically, FIG. 6B schematically illustrates a method for configuring the RPU computing system 600 to perform a vector-vector outer product update operation (e.g., blocks 410-413, FIG. 4B) and generate a deflated matrix which is stored in the RPU array 605. FIG. 6B schematically illustrates a configuration of the RPU computing system 600 in which multiplexers in the peripheral circuitry of the computing system 600 are activated to selectively connect row line driver circuitry 640 to the row lines R1, R2, ..., Rn. The row line driver circuitry 640 comprises a plurality of DAC circuit blocks 642-1, 642-2, ..., 642-n (collectively DAC circuit blocks 642) which are connected to respective row lines R1, R2, ..., Rn. As further shown in FIG. 6B, for the update operation, the DAC circuit blocks 622-1, 622-2, ..., 622-n are connected to the respective column lines C1, C2, ..., Cn. The DAC circuit blocks 642 perform the same function as the DAC circuit blocks 622 as described above.

As shown in FIG. 6B, an update operation (vector-vector outer product operation) performed on the array of RPU cells 605 of the computing system 600 comprises an outer product of a first vector U and a second vector V, U⊗V, which vectors are generated based on a currently estimated eigenpair($\lambda_i$, $x_i$) of matrix A (e.g., first dominant eigenpair ($\lambda_1$, $x_1$). The first vector $U = \lambda_i x_i = [(\lambda_i x_i)_1, (\lambda_i x_i)_2, \ldots (\lambda_i x_i)_n]$ is provided by the digital processing system and input the DAC circuitry 620 of the RPU system 600. In particular, as shown in FIG. 6B, digital signals $(\lambda_i x_i)_1, (\lambda_i x_i)_2, \ldots (\lambda_i x_i)_n$ are input to respective DAC circuit blocks 642-1, 642-2, ..., 642-n. The DAC circuit blocks 642-1, 642-2, ..., 642-n generate analog voltages $V_1, V_2, \ldots, V_n$ using the same or similar time-encoding techniques as discussed above to generate pulse-modulated voltage pulses (with a same amplitude but tunable pulse width) which correspond to the values of the respective digital signals $(\lambda_i x_i)_1, (\lambda_i x_i)_2, \ldots (\lambda_i x_i)_n$.

In addition, the second vector $V = x_i^T = [(x_i^T)_1, (x_i^T)_2, \ldots (x_i^T)_n]$ is provided by the digital processing system and input the DAC circuitry 620 of the RPU system 600. In particular, as shown in FIG. 6B, the digital signals $(x_i^T)_1, (x_i^T)_2, \ldots (x_i^T)_n$ are input to the respective DAC circuit blocks 622-1, 622-2, ..., 622-n which are connected to the respective columns C1, C2, ..., Cn. The DAC circuit blocks 622-1, 622-2, ..., 622-n generate analog voltages $V_1, V_2, \ldots, V_n$ using the same or similar time-encoding techniques as discussed above to generate pulse-modulated voltage pulses (with a same amplitude but tunable pulse width) which correspond to the values of the respective digital signals $(x_i^T)_1, (x_i^T)_2, \ldots (x_i^T)_n$.

The outer product update process is performed on the RPU array 605 by simultaneously applying the voltage pulses representing vectors U and V to the rows and the columns to perform a local multiplication operation and an incremental weight update at each cross-point (RPU cell 610) and thereby generate a deflated matrix in the RPU array 605. Again, various methods known to those of ordinary skill in the art can be used to generate the analog voltage pulses (e.g., stochastic pules) and implement the vector-vector outer product update process in the analog domain.

Figure 7:
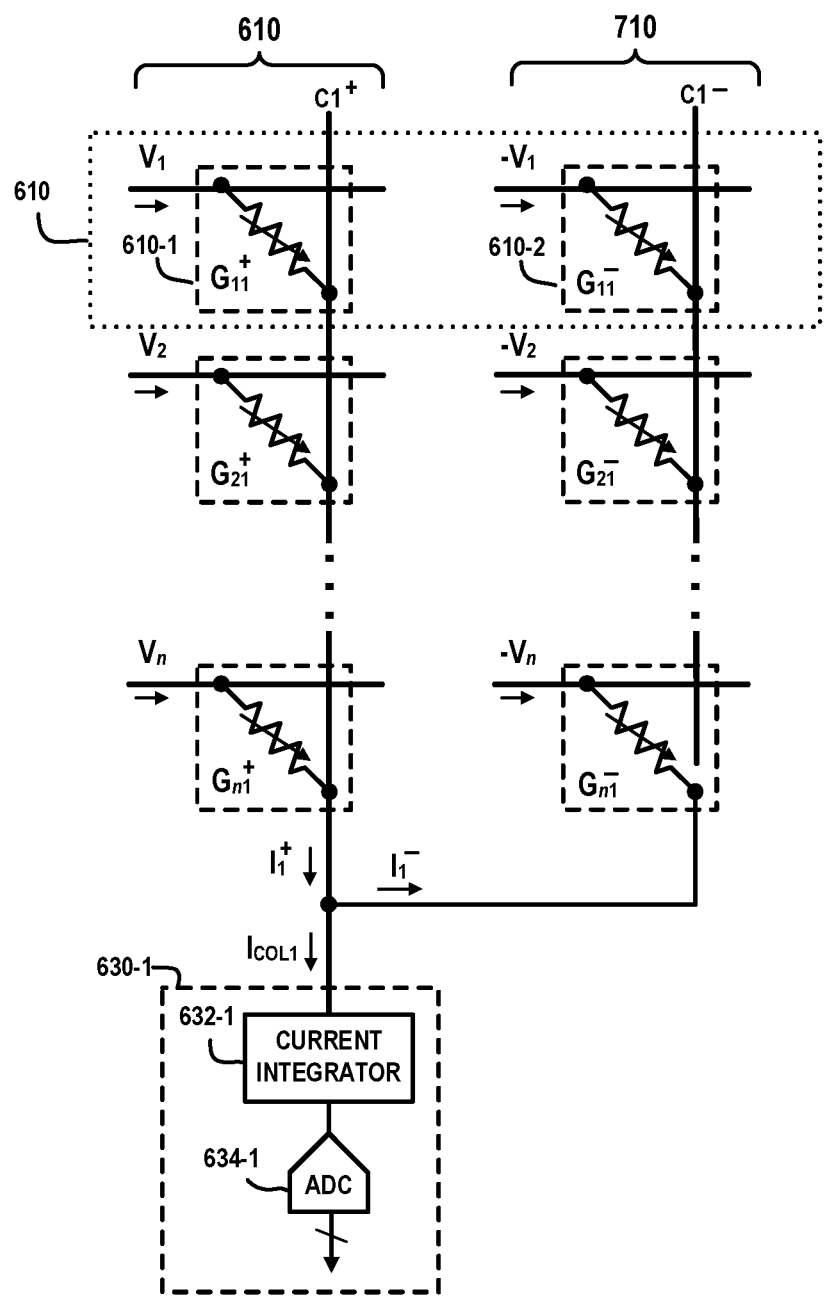
FIG. 7 schematically illustrates a method for configuring an RPU computing system comprising multiple arrays of RPU cells to perform a matrix-vector operation for an eigenpair computation process using signed matrix values, according to an exemplary embodiment of the disclosure.

While FIG. 6A schematically illustrates an exemplary method for generating the aggregate row currents for a matrix-vector multiplication operation performed in the analog domain, other techniques can be implemented to generate the aggregate currents using differential current techniques that allow for "signed matrix value." For example, FIG. 7 schematically illustrates a method for configuring an RPU computing system comprising multiple arrays of RPU cells to perform a matrix-vector operation for an eigenpair computation process using signed matrix values, according to an exemplary embodiment of the disclosure. In particular, FIG. 7 schematically illustrates a method for generating an aggregate column current $I_{COL1}$ using different column currents $I_1^+$ and $I_1^-$ from corresponding columns C1$^+$ and C1$^-$ of two separate RPU arrays 610 and 710, wherein the conductance is determined as ($G^+ - G^-$). For illustrative purposes, FIG. 7 illustrates a scheme for performing a matrix-vector operation Ax as discussed above, wherein it is assumed that a transpose matrix $A^T$ is stored in the RPU array, and the input vector x is applied to the rows of the RPU array, and the resulting vector is output from the columns. FIG. 7 schematically illustrates a differential read scheme in which an aggregate column current $I_{COL1}$ that is input to the readout circuit block 630-1 is determined as $I_{COL1} = I_1^+ - I_1^-$. With this differential scheme, the magnitude of $I_{COL1}$ will correspond to a given matrix value, wherein the sign of the matrix value will depend on the whether $I_1$ is greater than, equal to, or less than, $I_1^-$. A positive sign ($I_{COL1} > 0$) will be obtained when $I_1 > I_1^-$. A zero value ($I_{COL1} = 0$) will be obtained when $I_1 = I_1^-$. A negative sign ($I_{COL1} < 0$) will be obtained when $I_1 < I_1^-$.

More specifically, in the exemplary embodiment of FIG. 7, each RPU cell 610 in the computing system 600 of FIG. 6A comprises two unit RPU cells 610-1 and 610-2 which have respective conductance values $G_{ij}^+$ and $G_{ij}^-$, wherein the conductance value of a given RPU cell 610 is determined as the difference between the respective conductance values, i.e., $G_{ij} = G_{ij}^+ - G_{ij}^-$ where i and j are indices within the RPU array 605. In this way, negative and positive weights can be readily encoded using positive-only conductance values. In other words, since the conductance values of the resistive devices of the RPU cells can only be positive, the differential scheme in FIG. 7 implements a pair of identical RPU device arrays to encode positive ($G_{ij}^+$) and negative ($G_{ij}^-$) matrix values, wherein the matrix value ($G_{ij}$) of a given RPU cell is proportional to a difference of two conductance values stored in two corresponding devices ($G_{ij}^+ - G_{ij}^-$) located in identical positions of the pair of RPU arrays 610 and 710 (wherein the two RPU arrays 610 and 710 can be stacked on top of each other in a back-end-of-line metallization structure of a chip). In this instance, a single RPU tile is deemed a pair of RPU arrays with the peripheral circuits that support the parallel operation of the array in all three cycles.

A shown in FIG. 7, positive voltage pulses ($V_1$, $V_2$, ..., $V_n$) and corresponding negative voltage pulses ($-V_1$, $-V_2$, ..., $-V_n$) are supplied separately to the RPU cells 610-1 and 610-2 in corresponding rows in the identical RPU arrays 610 and 710 that are used to encode positive and negative inverse matrix values. The aggregate column currents $I_1^+$ and $I_1^-$ that are output from the corresponding first columns C1$^+$ and C1$^-$ in the respective RPU arrays 610 and 710 are combined to generate a differential aggregate current $I_{COL1}$ which is input to the readout circuit block 630-1 connected to the corresponding first columns C1$^+$ and C1$^-$.

In some embodiments where complex matrices are implemented (e.g., a complex matrix which comprises a real part and an imaginary part), the RPU framework of FIG. 7 can be implemented to store real and imaginary matrix values in two distinct RPU arrays. For example, in the exemplary embodiment of FIG. 7, the first RPU array 610 can be configured to store the real matrix values of a complex matrix, while the corresponding second RPU array 710 is configured to store the imaginary matrix values of the complext matrix. In this manner, the respective parts can then be processed separately, making it possible to obtain a conjugate transpose A* and a pseudoinverse $A^\dagger$.

It is to be further understood that other eigen decomposition operations or linear system computations in which both a matrix A and its transpose (e.g., $A^T$) are needed for a given computation are readily implemented using the hardware acceleration methods as discussed herein. For example, as discussed above, assuming a given matrix A is stored in an array of RPU cells, a matrix-vector operation Ax can be performed by applying the vector x to the column lines of the RPU array, and reading the resulting output vector from the row lines of the RPU array. At the same time, with the matrix A stored in the RPU array, a matrix-vector operation $A^T x$ can be performed by applying the vector x to the row lines of the RPU array, and reading the resulting output vector from the column lines of the RPU array. In this regard, there is no need to store the matrix A and its transpose $A^T$ in different RPU arrays.

In other embodiments, the same or similar process flow as shown and described above in conjunction with, e.g., FIGS. 4A and 4B can be used to perform a singular value decomposition (SVD) process to determine singular values $\sigma_1$, $\sigma_2$, ..., $\sigma_n$ of a given symmetric matrix A. In general, a process for computing the SVD of a given matrix A comprises determining eigenvalues and eigenvectors of $AA^T$ and $A^T A$. Assuming that the given matrix A is a symmetric n×n matrix (but not an SPD matrix), the singular values $\sigma_1$, $\sigma_2$, ..., $\sigma_n$ are determined by computing the square roots of the eigenvalues of the matrix $AA^T$ or the matrix $A^T A$. On the other hand, if the given matrix A is an SPD matrix, then the singular values $\sigma_1$, $\sigma_2$, ..., $\sigma_n$ are equal to eigenvalues of the matrix $AA^T$ or the matrix $A^T A$.

In some embodiments, an SVD process for a given symmetric n×n matrix A is performed by computing, in the digital domain, a given matrix $B = AA^T$ or $B = A^T A$, storing the resulting n×n matrix B in one or more RPU arrays, and then performing an iterative process (e.g., eigen-decomposition process) as shown and described above in conjunction with FIGS. 4A and 4B to determine the eigenvalues $\lambda_1, \lambda_2, ..., \lambda_n$ of the n×n matrix B. If the symmetric matrix A is an SPD matrix, then the singular values $\sigma_1, \sigma_2, ..., \sigma_n$ are equal to the respective eigenvalues $\lambda_1, \lambda_2, ..., \lambda_n$ of the n×n matrix B. If the symmetric matrix A is not an SPD matrix, then the singular values $\sigma_1, \sigma_2, ..., \sigma_n$ are equal to the square roots of the respective eigenvalues $\lambda_1, \lambda_2, ..., \lambda_n$ of the n×n matrix B, i.e., the $i^{th}$ singular value $\sigma_i$ is equal to the square root of the $i^{th}$ eigenvalue $\lambda_i$ ($\sigma_i = \sqrt{\lambda_i}$).

In other embodiments, an SVD process for a given symmetric n×n matrix A is performed by storing the matrix A in the RPU array(s) and then performing an iterative process, which comprises a modified version of the process flow of FIGS. 4A and 4B, to determine the eigenvalues $\lambda_1$, $\lambda_2$, ..., $\lambda_n$ of the n×n matrix $B = AA^T$ or $B = A^T A$. Such embodiments are based on the fact that an RPU array naturally stores the matrix A as well as its transpose $A^T$. For example, referring to the exemplary embodiment of FIG. 6A, assume that the RPU array 605 stores an n×n matrix A, wherein the rows R1, R2, ..., Rn of the RPU array 605 represent the rows of the n×n matrix A, and that the columns C1, C2, ..., Cn of the RPU array 605 represent the columns of the n×n matrix A. At the same time, from the perspective of viewing the columns of the RPU array 605 as rows, and from the perspective of viewing the rows of the RPU array 605 as columns, we see that the columns of the RPU array 605 represent the rows of the transpose ($A^T$) of the matrix A, and that the rows of the RPU array 605 represent the columns of the transpose ($A^T$) of the matrix A. In other words, we see that the $i^{th}$ row of the n×n matrix A stored in the RPU array 605 effectively become the $i^{th}$ column of the n×n transpose ($A^T$) of the matrix A which is stored in the RPU array 605.

In view of the above, an exemplary process for computing the SVD of a symmetric n×n matrix A, which is stored in an RPU array, is based on an iterative process to compute the eigenvalues of, e.g., $AA^T$, which involves computing $AA^T x^{(j)} = A(A^T x^{(j)}) = Ay^{(j)} = x^{(j+1)}$ (j=0, 1, ...) using a variation of the process flow of blocks 401, 402, and 403 of FIG. 4A. In particular, assume that in block 400 the initial vector $x^{(0)}$ (n×1 column vector) is generated as discussed above. Next, the initial digital vector $x^{(0)}$ is input to the RPU system to perform (in block 402) an analog matrix-vector multiplication process (i.e., $A^T x^{(0)} = y^{(0)}$) by multiplying the initial vector $x^{(0)}$ and the transpose $A^T$ of the matrix A stored in the RPU array(s) to generate a resulting vector $y^{(0)}$. In some embodiments, the matrix-vector multiplication process $A^T x^{(0)}$ is performed by inputting the initial vector $x^{(0)}$ to the rows of the RPU array 605 (FIG. 6A), in which case the input to the row lines would be selectively connected to DAC circuitry (e.g., DAC circuitry 640, FIG. 6B), and the resulting vector $y^{(0)}$ would be output from the columns of the RPU array, in which case the column lines would be selectively connected to readout circuitry (e.g., readout circuitry 630, FIG. 6A) to generate and output the resulting digital vector $y^{(0)}$.

Next, the resulting vector $y^{(0)}$ would be re-input to the RPU array 605 to perform the analog matrix-vector multiplication process $Ay^{(0)}$ and thereby compute $Ay^{(0)} = x^{(1)}$. In this process, the vector $y^{(0)}$ would be input to the columns of the RPU array 605, in which case the input to the column lines would be selectively connected to DAC circuitry (e.g., DAC circuitry 620, FIG. 6A), and the resulting vector $x^{(1)}$ would be output from the rows of the RPU array 605, in which case the row lines would be selectively connected to readout circuitry (e.g., readout circuitry 630, FIG. 6A) to generate and output the resulting digital vector $x^{(1)}$.

The resulting digital vector $x^{(1)}$ would then be output to the digital computing system and normalized (e.g., block 403, FIG. 4A). Next, the normalized vector $x^{(1)}$ would be re-input to the RPU system to compute (for the next iteration, j=1) $AA^T x^{(1)} = A(A^T x^{(1)}) = Ay^{(1)} = x^{(2)}$, by performing the two matrix-multiplication operations as discussed above.

Similar to the process flow of FIGS. 4A and 4B, the iterative process continues until the convergence criterion is met (e.g., block 406, FIG. 4A) in which case, following the $j^{th}$ iteration, the vector $x^{(j+1)}$ denotes an approximation of the dominant eigenvector $x_1$ for the matrix $B=AA^T$.

For the exemplary SVD process, the iterative process flow of FIGS. 4A and 4B (with the modification of blocks 401, 402, and 403 as discussed above) can be performed to compute some or all of the eigenvectors $x_1, x_2, \ldots, x_n$ and corresponding eigenvalues $\lambda_1, \lambda_2, \ldots, \lambda_n$ (via block 408, FIG. 4A) of the n×n matrix $B=AA^T$. Following the computation of the eigenvalues $\lambda_1, \lambda_2, \ldots, \lambda_n$ of the matrix B, the singular values of the SVD process will be equal to the computed eigenvalues $\lambda_1, \lambda_2, \ldots, \lambda_n$ of the matrix B (assuming the matrix A is an SPD matrix). Otherwise, in the digital domain, the singular values of the SVD process will be computed by taking the square roots of the respective eigenvalues $\lambda_1, \lambda 2, \ldots, \lambda_n$ of the n×n matrix B. It is to be noted that for a symmetric matrix A, in an alternate embodiment, the process flow of FIGS. 4A and 4B can be performed to compute the eigenvalues of $B=A^TA$, if $x^{(j)}$ is first input to the rows of the RPU array to compute $A_x^{(j)}$ and the resulting vector $y^{(j)}$ is input to the columns to compute $A^Ty^{(j)}=x^{(j+1)}$.

Exemplary embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
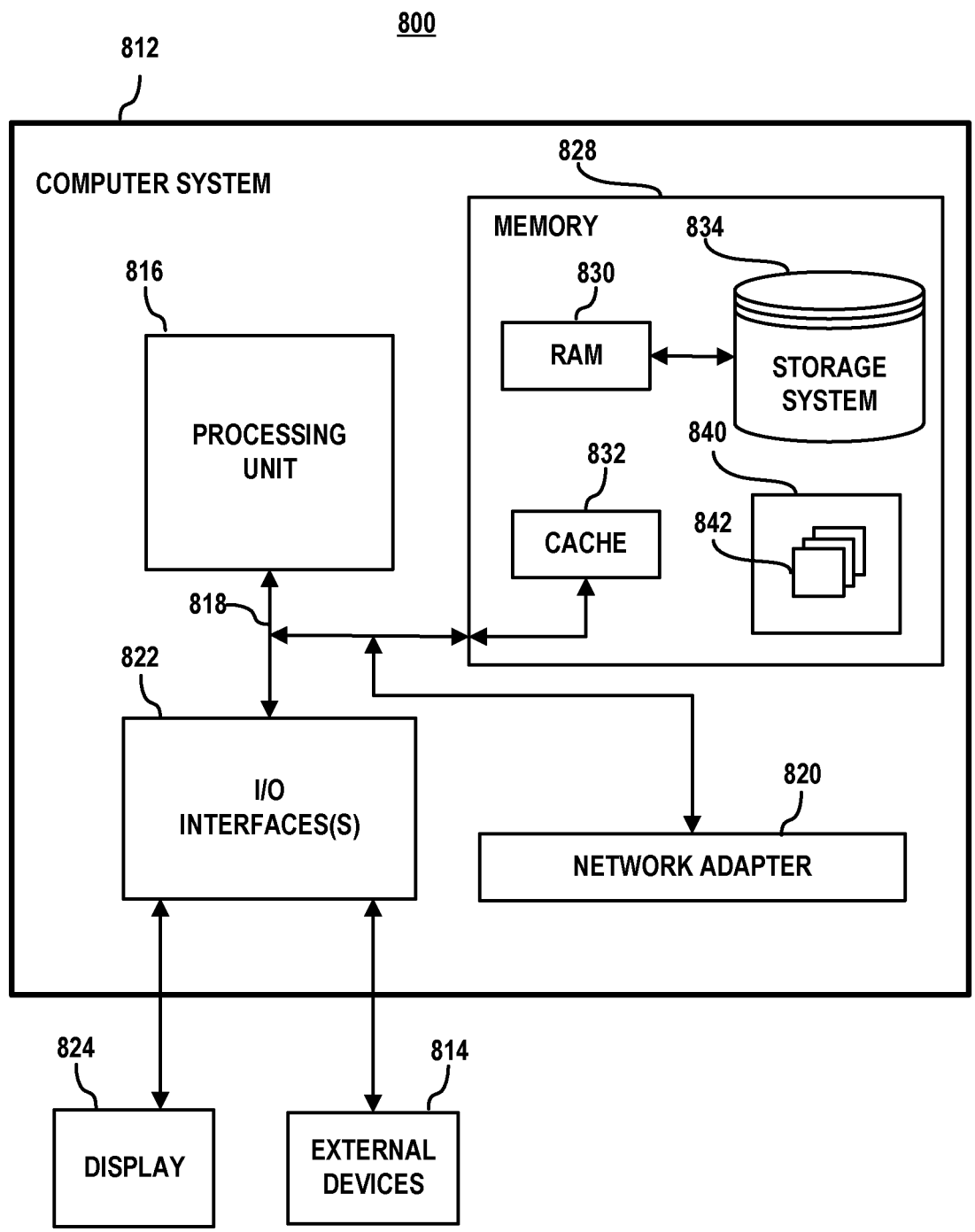
FIG. 8 schematically illustrates an exemplary architecture of a computing node which can host a system that is configured to execute an eigenpair computation process according to an exemplary embodiment of the disclosure.

These concepts are illustrated with reference to FIG. 8, which schematically illustrates an exemplary architecture of a computing node that can host a system which is configured to execute an eigenpair computation process, according to an exemplary embodiment of the disclosure. FIG. 8 illustrates a computing node 800 which comprises a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

In FIG. 8, computer system/server 812 in computing node 800 is shown in the form of a general-purpose computing device. The components of computer system/server 812 may include, but are not limited to, one or more processors or processing units 816, a system memory 828, and a bus 818 that couples various system components including system memory 828 to the processors 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random-access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As depicted and described herein, memory 828 may include at least one program product having a set (e.g., at least one) of program modules that are configured to carry out the functions of embodiments of the invention.

The program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the disclosure as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, SSD drives, and data archival storage systems, etc.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
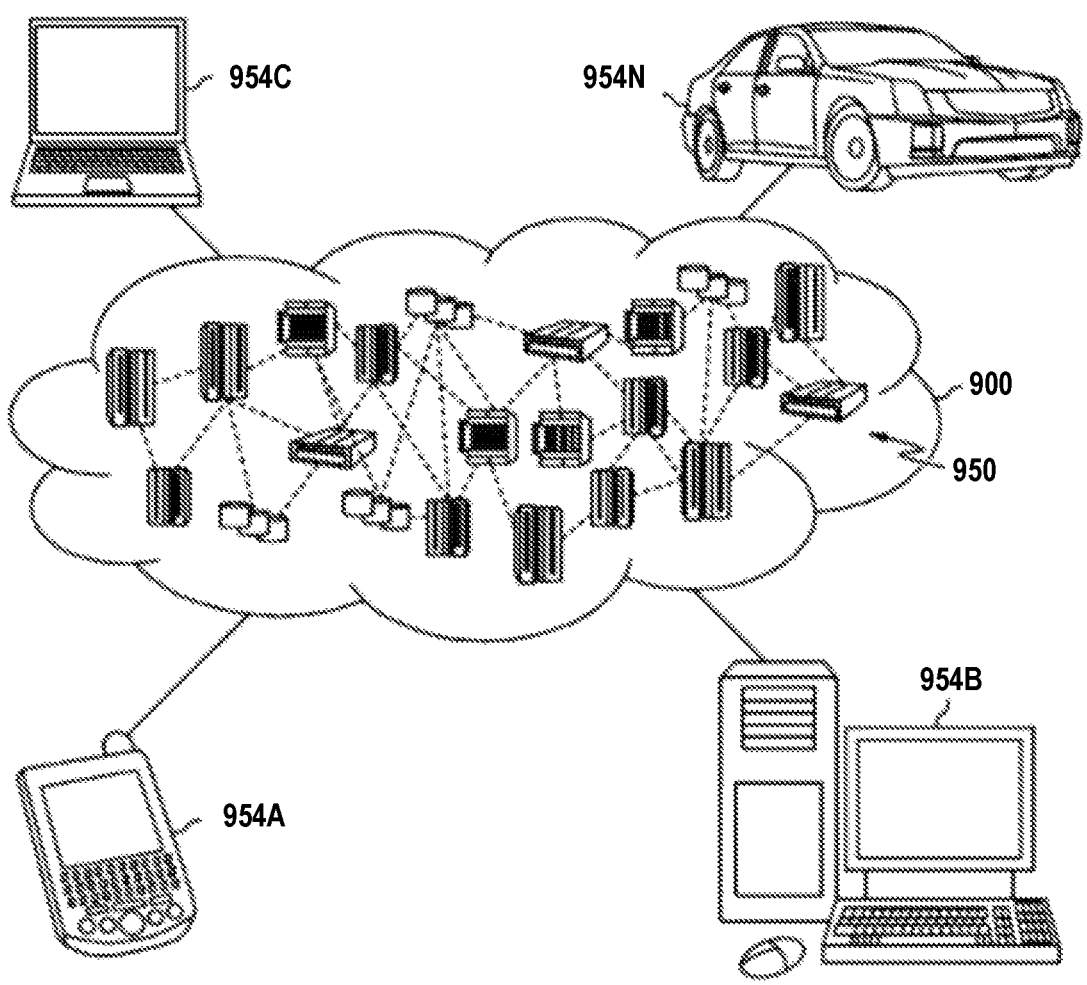
FIG. 9 depicts a cloud computing environment according to an exemplary embodiment of the disclosure.

Referring now to FIG. 9, illustrative cloud computing environment 900 is depicted. As shown, cloud computing environment 900 includes one or more cloud computing nodes 950 with which local computing devices used by cloud consumers, such as, for example, personal digital assistant (PDA) or cellular telephone 954A, desktop computer 954B, laptop computer 954C, and/or automobile computer system 954N may communicate. Nodes 950 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 954A-N shown in FIG. 9 are intended to be illustrative only and that computing nodes 950 and cloud computing environment 900 can communicate with any type of computerized device over any type of network and/or network addressable connection (e.g., using a web browser).

Figure 10:
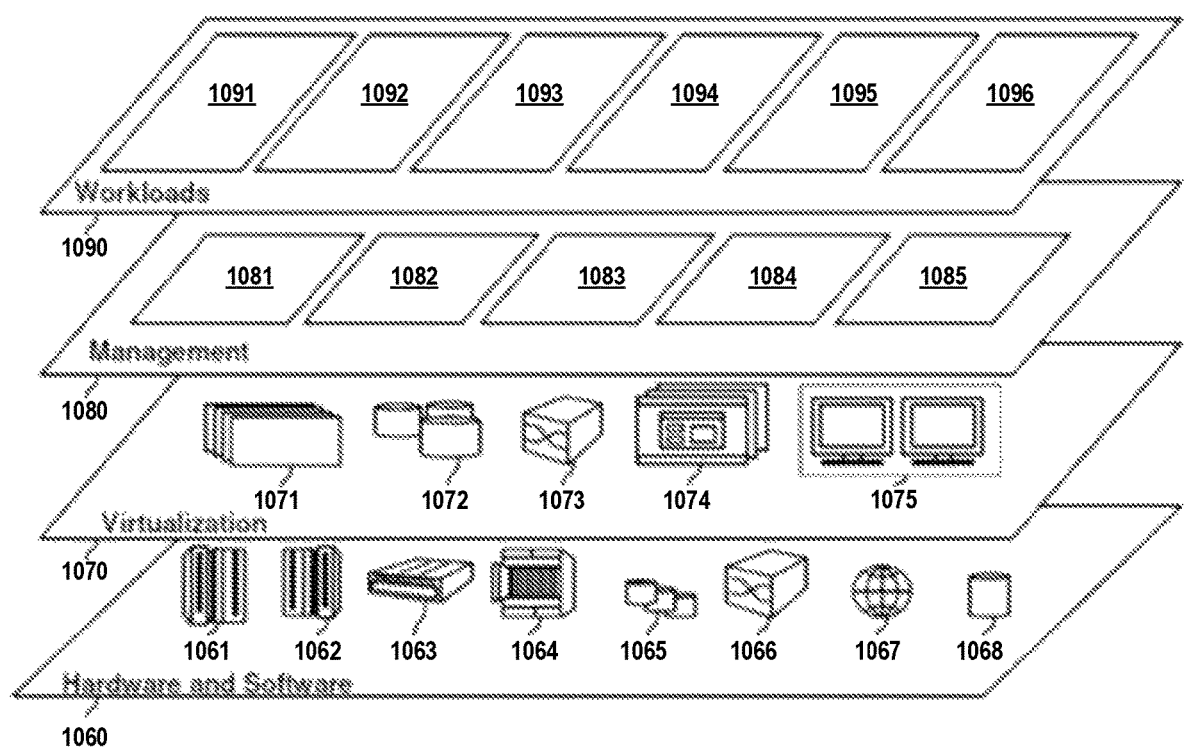
FIG. 10 depicts abstraction model layers according to an exemplary embodiment of the disclosure.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and various functions 1096 for performing operations such as computing eigenpairs of a matrix, performing matrix operations, performing eigen decomposition operations such as matrix diagonalization, singular value decomposition, etc., using an RPU system with RPU arrays to provide hardware accelerated computing and analog in-memory computations based on the exemplary methods and functions discussed above in conjunction with, e.g., FIGS. 3, 4A and 4B. Furthermore, in some embodiments, the hardware and software layer 1060 would include the computing system 100 of FIG. 1 to implement or otherwise support the various workloads and functions 1096 for performing such hardware accelerated computing and analog in-memory computations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor; and
   a resistive processing unit coupled to the processor, the resistive processing unit comprising an array of cells, the cells comprising respective resistive devices, the resistive devices comprising resistances that are tunable to encode values of a matrix that is storable in the array of cells;
   wherein the processor executes program instructions to:
   store the matrix in the resistive processing unit by tuning resistances of respective resistive devices of at least a portion of the array of cells to encode values of the matrix in the resistive processing unit; and
   utilize the resistive processing unit to determine an eigenvector of the stored matrix by executing a process which comprises performing analog matrix-vector multiplication operations on the stored matrix to converge an initial vector to an estimate of the eigenvector of the stored matrix.

2. The system of claim 1, wherein in executing the process, the processor is configured to:
   estimate an eigenvalue associated with the estimated eigenvector; and
   return at least one eigenpair of the stored matrix as a result of the process, wherein the at least one eigenpair of the stored matrix comprises the estimated eigenvector and the estimated eigenvalue associated with the estimated eigenvector.

3. The system of claim 1, wherein in executing the process, the processor is configured to execute a power iteration process to estimate a dominant eigenvector of the stored matrix, and to estimate a dominant eigenvalue associated with the estimated dominant eigenvector.

4. The system of claim 1, wherein in executing the process, the processor is configured to:
   estimate an inverse matrix of the matrix;
   store the estimated inverse matrix in the array of cells; and
   execute an inverse power iteration process to estimate a dominant eigenvector of the estimated inverse matrix, and to estimate a dominant eigenvalue associated with the estimated dominant eigenvector of the estimated inverse matrix.

5. The system of claim 1, wherein in executing the process, the processor is configured to:
   perform a first iteration, which comprises:
      inputting the initial vector to the array of cells;
      utilizing the resistive processing unit to perform a first matrix-vector multiplication operation by multiplying the initial vector with the stored matrix in the array of cells to generate a first output vector which is output from the array of cells; and
      performing a normalization process to normalize the first output vector and thereby generate a first normalized vector; and
   perform at least a second iteration which comprises:
      inputting the first normalized vector to the array of cells;
      utilizing the resistive processing unit to perform a second matrix-vector multiplication operation by multiplying the first normalized vector with the stored matrix in the array of cells to generate a second output vector which is output from the array of cells; and
      perform the normalization process to normalize the second output vector and thereby generate a second normalized vector.

6. The system of claim 5, wherein the initial vector comprises one of a random vector and an estimate of a target eigenvector of the stored matrix.

7. The system of claim 5, wherein upon completing a plurality of iterations of the process, the processor is configured to:
   determine whether a last output vector generated from a last completed iteration of the plurality of iterations has converged to a target eigenvector of the stored matrix; and
   set the last output vector as the estimated eigenvector of the stored matrix in response to determining that the last output vector has converged to the target eigenvector of the stored matrix.

8. The system of claim 1, wherein in executing the process, the processor is configured to:
utilize the resistive processing unit to update matrix values of the stored matrix in the array of cells and thereby generate an updated matrix in which the estimated eigenvalue of the matrix is set to zero;
repeat the process on the updated matrix stored in the array of cells to estimate a second eigenvector of the matrix; and
estimate a second eigenvalue associated with the estimated second eigenvector.

9. The system of claim 8, wherein in utilizing the resistive processing unit to update matrix values of the stored matrix in the array of cells, the processor is configured to perform an outer product operation of a first vector and a second vector on the stored matrix;
wherein the first vector comprises the estimated eigenvector scaled by the associated estimated eigenvalue; and
wherein the second vector comprises a transpose of the estimated eigenvector.

10. A computer program product, comprising:
one or more computer readable storage media, and program instructions collectively stored on the one or more computer readable storage media, the program instructions comprising:
program instructions to receive a matrix from an application;
program instructions to store the matrix in an array of cells of a resistive processing unit, the cells comprising respective resistive devices, the resistive devices comprising resistances that are tunable to store the matrix in the resistive processing unit by tuning resistances of respective resistive devices of at least a portion of the array of cells to encode values of the matrix in the resistive processing unit; and
program instructions to utilize the resistive processing unit to perform a process to determine an eigenvector of the matrix, wherein the program instructions to execute the process comprise program instructions to perform analog matrix-vector multiplication operations on the stored matrix to converge an initial vector to an estimate of the eigenvector of the stored matrix.

11. The computer program product of claim 10, wherein the program instructions to perform the process further comprise:
program instructions to estimate an eigenvalue associated with the estimated eigenvector; and
program instructions to return at least one eigenpair of the matrix to the application, wherein the at least one eigenpair comprises the estimated eigenvector and the estimated eigenvalue associated with the estimated eigenvector.

12. The computer program product of claim 10, wherein the program instructions to perform the process comprise program instructions to execute a power iteration process to estimate a dominant eigenvector of the stored matrix, and to estimate a dominant eigenvalue associated with the estimated dominant eigenvector.

13. The computer program product of claim 10, wherein:
the program instructions to store the matrix in the array of cells of the resistive processing unit, comprise program instructions to estimate an inverse matrix of the matrix and store the estimated inverse matrix of the matrix in the array of cells of the resistive processing unit; and
the program instructions to perform the process comprise program instructions to execute an inverse power iteration process to estimate a dominant eigenvector of the estimated inverse matrix, and to estimate a dominant eigenvalue associated with the estimated dominant eigenvector of the estimated inverse matrix.

14. The computer program product of claim 10, wherein the program instructions to perform the process comprise:
program instructions to perform a first iteration, which comprises:
inputting the initial vector to the array of cells;
performing a first matrix-vector multiplication operation by multiplying the initial vector with the stored matrix in the array of cells to generate a first output vector which is output from the array of cells; and
performing a normalization process to normalize the first output vector and thereby generate a first normalized vector; and
program instructions to perform at least a second iteration which comprises:
inputting the first normalized vector to the array of cells;
performing a second matrix-vector multiplication operation by multiplying the first normalized vector with the stored matrix in the array of cells to generate a second output vector which is output from the array of cells; and
performing the normalization process to normalize the second output vector and thereby generate a second normalized vector.

15. The computer program product of claim 14, wherein the program instructions to perform the process further comprise:
program instruction to determine, upon completing a plurality of iterations of the process, whether a last output vector generated from a last completed iteration of the plurality of iterations has converged to a target eigenvector of the stored matrix; and
program instructions to set the last output vector as the estimated eigenvector of the stored matrix in response to determining that the last output vector has converged to the target eigenvector of the stored matrix.

16. The computer program product of claim 10, further comprising:
program instructions to utilize the resistive processing unit to update matrix values of the stored matrix in the array of cells and thereby generate an updated matrix in which the determined eigenvalue of the matrix is set to zero;
program instructions to repeat the process on the updated matrix stored in the array of cells to estimate a second eigenvector of the matrix; and
program instructions to determine a second eigenvalue associated with the estimated second eigenvector.

17. The computer program product of claim 16, wherein:
the program instructions to utilize the resistive processing unit to update matrix values of the stored matrix in the array of cells comprise program instructions to perform an outer product operation of a first vector and a second vector on the stored matrix;
wherein the first vector comprises the estimated eigenvector scaled by the associated eigenvalue; and
wherein the second vector comprises a transpose of the estimated eigenvector.

18. A method comprising:
receiving a matrix from an application;
storing the matrix in an array of cells of a resistive processing unit, the cells comprising respective resistive devices, the resistive devices comprising resistances that are tunable to store the matrix in the resistive processing unit by tuning resistances of respective resistive devices of at least a portion of the array of cells to encode values of the matrix in the resistive processing unit; and utilizing the resistive processing unit to perform a process to determine an eigenvector of the matrix, wherein performing the process comprises performing analog matrix-vector multiplication operations on the stored matrix to converge an initial vector to an estimate of the eigenvector of the stored matrix.

19. The method of claim 18, wherein performing the process further comprises:

estimating an eigenvalue associated with the estimated eigenvector; and returning at least one eigenpair of the matrix to the application, wherein the at least one eigenpair comprises the estimated eigenvector and the estimated eigenvalue associated with the estimated eigenvector.

20. The method of claim 18, wherein performing the process further comprises:

estimating an eigenvalue associated with the estimated eigenvector;

utilizing the resistive processing unit to update matrix values of the stored matrix in the array of cells and thereby generate an updated matrix in which the estimate eigenvalue of the matrix is set to zero;

repeating the process on the updated matrix stored in the array of cells to estimate a second eigenvector of the matrix; and estimating a second eigenvalue associated with the estimated second eigenvector;

wherein utilizing the resistive processing unit system to update matrix values of the stored matrix in the array of cells comprises performing an outer product operation of a first vector and a second vector on the stored matrix;

wherein the first vector comprises the estimated eigenvector scaled by the associated eigenvalue; and wherein the second vector comprises a transpose of the estimated eigenvector.

* * * * *